United States Patent
Walker et al.

(10) Patent No.: US 12,455,719 B1
(45) Date of Patent: Oct. 28, 2025

(54) SPEAKER CONTROL BASED ON PROXIMITY

(71) Applicant: SimpliSafe, Inc., Boston, MA (US)

(72) Inventors: Devin Walker, Somerville, MA (US); Rodrigo Alexei Vasquez, Medford, MA (US)

(73) Assignee: SimpliSafe, Inc., Boston, MA (US)

( * ) Notice: Subject to any disclaimer, the term of this patent is extended or adjusted under 35 U.S.C. 154(b) by 0 days.

(21) Appl. No.: 18/638,882

(22) Filed: Apr. 18, 2024

(51) Int. Cl.
| | |
|---|---|
| *G06F 3/16* | (2006.01) |
| *G06V 10/25* | (2022.01) |
| *G06V 10/74* | (2022.01) |
| *G06V 10/82* | (2022.01) |
| *G06V 40/10* | (2022.01) |
| *H04N 7/18* | (2006.01) |
| *H04R 29/00* | (2006.01) |

(52) U.S. Cl.
CPC ............. *G06F 3/165* (2013.01); *G06V 10/25* (2022.01); *G06V 10/761* (2022.01); *G06V 10/82* (2022.01); *G06V 40/103* (2022.01); *H04N 7/188* (2013.01); *H04R 29/004* (2013.01); *H04R 2430/01* (2013.01)

(58) Field of Classification Search
CPC ...... G06F 3/165; G06V 10/25; G06V 10/761; G06V 10/82; G06V 40/103; H04N 7/188; H04R 29/004; H04R 2430/01
See application file for complete search history.

(56) References Cited

U.S. PATENT DOCUMENTS

| | | | |
|---|---|---|---|
| 6,473,604 B1 | 10/2002 | Hinkle et al. | |
| 7,706,551 B2 | 4/2010 | Falcon | |
| 12,009,877 B1 | 6/2024 | Eubank et al. | |
| 12,248,733 B1 | 3/2025 | Walker | |
| 2006/0177046 A1 | 8/2006 | Falcon | |
| 2009/0015425 A1 | 1/2009 | Palmqvist et al. | |
| 2009/0116667 A1 | 5/2009 | Lin et al. | |
| 2015/0362998 A1* | 12/2015 | Park ..................... | G06F 3/0485 345/173 |
| 2019/0311718 A1* | 10/2019 | Huber ..................... | G10L 15/22 |
| 2021/0004201 A1 | 1/2021 | Munoz et al. | |
| 2021/0098013 A1 | 4/2021 | Day | |
| 2021/0318850 A1 | 10/2021 | Thomas | |
| 2021/0365707 A1* | 11/2021 | Mao ..................... | G06V 20/46 |

(Continued)

FOREIGN PATENT DOCUMENTS

WO 2024/025123 A1 2/2024

OTHER PUBLICATIONS

International Search Report and Written Opinion from corresponding International Application PCT/US2025/024030, mailed Jul. 22, 2025.

*Primary Examiner* — Angelica M Mckinney
(74) *Attorney, Agent, or Firm* — Finch & Maloney PLLC

(57) ABSTRACT

Security systems and methods. In one example, a method includes processing, by a device that includes a camera, an image to generate a bounding box that surrounds a portion of content of the image, the portion of content of the image including at least a portion of a person shown in the image, determining a proximity of the person to the device based on a size of the bounding box, and adjusting a speaker of the device based on the proximity of the person to modify one or more audio characteristics of sound output by the speaker based on the proximity of the person to the device.

20 Claims, 13 Drawing Sheets

(56) References Cited

U.S. PATENT DOCUMENTS

| | | |
|---|---|---|
| 2022/0012900 A1 | 1/2022 | Chen et al. |
| 2024/0064406 A1 | 2/2024 | Veselinovic et al. |
| 2024/0202936 A1* | 6/2024 | Shin .................. G06T 7/20 |
| 2024/0321286 A1 | 9/2024 | Cassidy et al. |

* cited by examiner

SPEAKER CONTROL BASED ON PROXIMITY

TECHNICAL FIELD

Aspects of the technologies described herein relate to security systems and methods.

BACKGROUND

Some monitoring systems use one or more cameras to capture images of areas around or within a residence or business location. Such monitoring systems can process images locally and transmit the captured images to a remote service. If motion is detected, the monitoring systems can send an alert to one or more user devices.

SUMMARY

This disclosure is directed to techniques for adjusting (e.g., automatically adjusting) the volume of a speaker based on the proximity of a person to the speaker. At least one example is directed to a method. The method includes initiating a communication session using a device having a speaker, processing input from at least one sensor to determine an indication of proximity of a person to the device, based on the indication of proximity, automatically selecting a speaker profile for the speaker, and applying the speaker profile to automatically control one or more audio characteristics of the speaker.

Another example is directed to a device comprising a camera, a speaker, and a controller configured to process an image acquired by the camera to determine an indication of proximity of a person to the device, and to automatically control a volume of the speaker based on the indication of proximity.

Another example is directed to one or more non-transitory computer-readable media storing sequences of instructions executable to control a security camera disposed at a location, the sequences of instructions comprising instructions to acquire an image, apply an object detection process to the image to detect a person in the image, determine an indication of proximity of the person to the security camera, and control a volume of a speaker of the security camera based on the indication of proximity.

BRIEF DESCRIPTION OF THE DRAWINGS

Additional examples of the disclosure, as well as features and advantages thereof, will become more apparent by reference to the description herein taken in conjunction with the accompanying drawings which are incorporated in and constitute a part of this disclosure. The figures are not necessarily drawn to scale.

DETAILED DESCRIPTION

Figure 1:
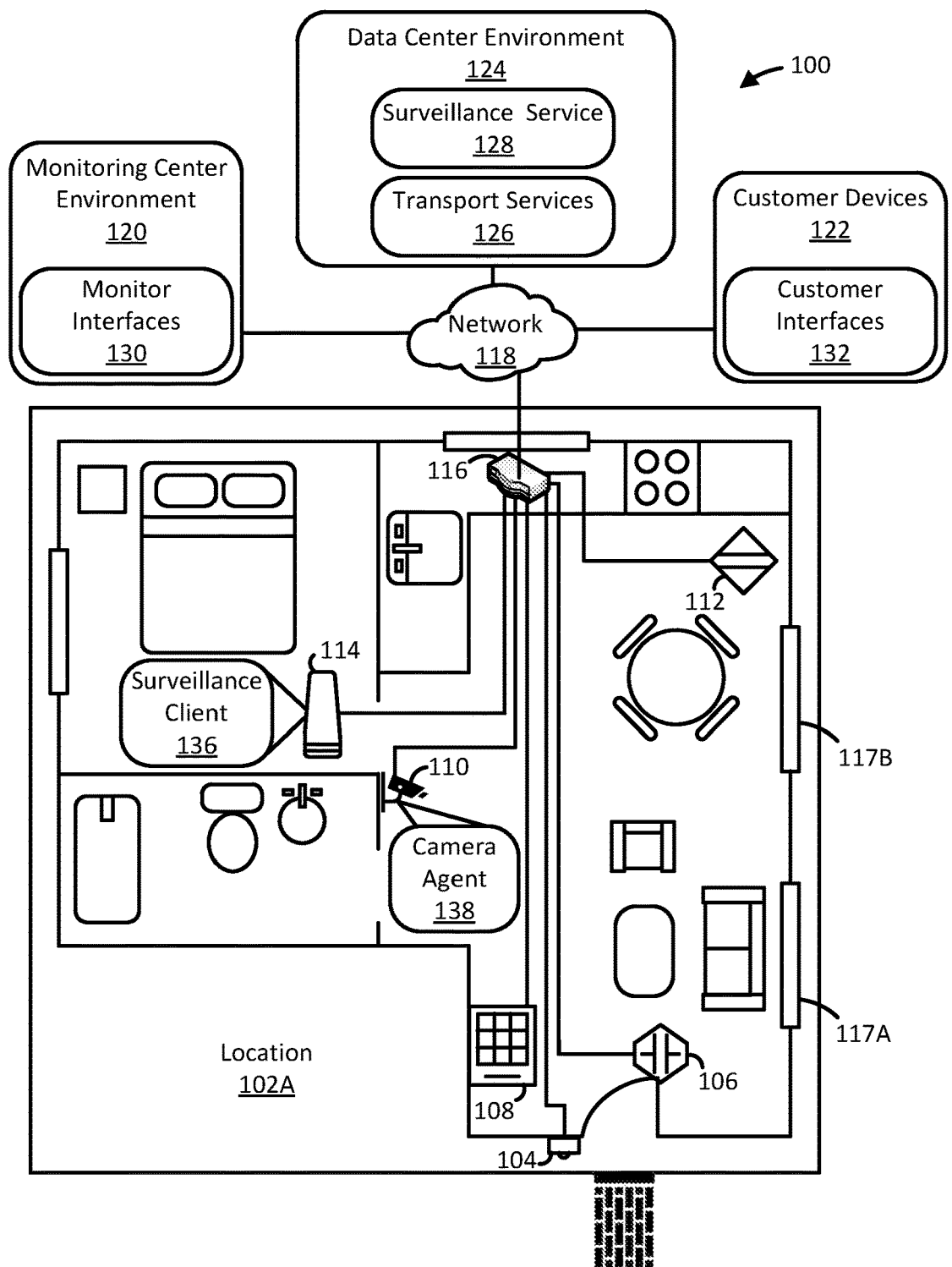
FIG. 1 is a schematic diagram of a security system, according to some examples described herein.

As summarized above, at least some examples disclosed herein relate to home security systems in which the output of a speaker can be adjusted based on a person's proximity to the speaker, so as to provide an improved communication experience for the person. For instance, in some examples, speaker volume is adjusted automatically.

In handling of alarms, various devices of a security system can be configured to allow communication sessions between one or more security devices located at a monitored location and a computing device located remote from the monitored location. According to certain examples, a home security system can be configured to provide two-way communication between a local device and a remotely-located device via a network connection. This capability allows a person at the monitored location to interact with remotely-located monitoring personnel to facilitate handling of alarm events at the monitored location. For example, by allowing remotely located monitoring personnel to view, hear, and potentially interact with persons at the monitored location, remote interventions supported by communication sessions can help monitoring personnel to determine if a dispatch of emergency services and/or law enforcement personnel is warranted. Such first responders may be dispatched to a monitored location.

In some examples, the two-way communication capability is provided via a local security device, such as an image capture device. As described further below, the image capture device may include a camera to acquire still and/or video images of the monitored location (including images of the person in some circumstances), along with a microphone and a speaker to facilitate establishing two-way communication between the person and the remotely-located monitoring personnel. In some circumstances, such as when the person is relatively far away from the image capture device, it may be preferable to operate the speaker at a relatively high volume so that the person can adequately hear audio output (e.g., speech and/or other sounds) emitted from the device. However, if the person is located very close to the image capture device, operating the speaker at high volume can be uncomfortable or unpleasant for the person. In addition, in some instances, when the speaker is operated at high volume, greater distortion can be present in the audio output. This may further degrade the communication experience for the person and potentially make it difficult for the person to understand what the monitoring professional may be trying to communicate.

Accordingly, techniques are disclosed herein by which an image capture device, or other communication device, can adjust (e.g., automatically adjust) the output (e.g., volume and/or other parameters) of a speaker based on the proximity of the person to the device. As described in more detail below, in some examples, an image capture device can be configured to acquire an image in which the person is depicted or otherwise represented, analyze the image, and determine an indication of proximity of the person to the image capture device based on a size of the person in the image. In some examples, object detection processes can be applied to the image to detect the person and to produce an indication (e.g., bounding box) denoting the person in the image. Based on a field of view of the image capture device and corresponding image frame size for the image capture device, the proximity of the person to the image capture device may be estimated based on the size of the bounding box and/or the portion of the person captured within the bounding box, as described further below. Thus, based on the size of the bounding box, or other indication of the proximity of the person, the image capture device may adjust one or more parameters of the speaker, referred to herein collectively as a speaker "profile." For example, the image capture device may automatically adjust the volume of the speaker (e.g., by controlling one or more amplifier settings) to produce sound at higher volume when a person is further away and lower volume when a person is close to the image capture device. In addition, in some examples, the image capture device may adjust audio processing settings (such as equalization, filtering, frequency-dependent gain, etc.) to increase, or potentially optimize, the quality of particular audio, such as speech, when the person is in close proximity to the image capture device.

According to certain examples, a method comprises initiating a session (e.g., a communication session) using a device having a speaker, processing input from at least one sensor to determine an indication of proximity of a person to the device, based on the indication of proximity, selecting (e.g., automatically select) a speaker profile for the speaker, and applying the speaker profile to control (e.g., automatically control) one or more audio output characteristics of the speaker. In some examples, the device includes a camera, and the method comprises determining the indication of proximity of a person based on processing one or more images acquired by the camera.

For example, a device may comprise a camera, a speaker, and a controller configured to process an image acquired by the camera to determine an indication of proximity of a person to the device. The controller can control (e.g., autonomously control) an output of the speaker based on the indication of proximity. For instance, in some examples, the controller can adjust audio settings that drive speaker operation to decrease the amplitude and/or flatten the frequency response of audio rendered by the speaker if the person is in close proximity to the speaker. Conversely, in some examples, the controller can adjust audio settings that drive speaker operation to increase the amplitude and/or widen the frequency of audio rendered by the speaker if the person is not in close proximity to the speaker. The device may be an image capture device, for example, that is disposed at a monitored location. In some examples, the device further includes a network connection and a microphone and can be configured to support one-way or two-way communications sessions with a remote device.

These and other features are described in further detail below.

Whereas various examples are described herein, it will be apparent to those of ordinary skill in the art that many more examples and implementations are possible. Accordingly, the examples described herein are not the only possible examples and implementations. Furthermore, the advantages described above are not necessarily the only advantages, and it is not necessarily expected that all of the described advantages will be achieved with every example.

For the purposes of promoting an understanding of the principles of the present disclosure, reference will now be made to the examples illustrated in the drawings, and specific language will be used to describe the same. It will nevertheless be understood that no limitation of the scope of the examples described herein is thereby intended.

FIG. 1 is a schematic diagram of a security system 100 configured to monitor geographically disparate locations in accordance with some examples. As shown in FIG. 1, the system 100 includes various devices disposed at a monitored location 102A, a monitoring center environment 120, a data center environment 124, one or more customer devices 122, and a communication network 118. Each of the monitoring center environment 120, the data center environment 124, the one or more customer devices 122, and the communication network 118 include one or more computing devices (e.g., as described below with reference to FIG. 12). The one or more customer devices 122 are configured to host one or more customer interface applications 132. The monitoring center environment 120 is configured to host one or more monitor interface applications 130. The data center environment 124 is configured to host a surveillance service 128 and one or more transport services 126. In some examples, devices at the monitored location 102A include image capture devices 104 and 110, a contact sensor assembly 106, a keypad 108, a motion sensor assembly 112, a base station 114, and a router 116. The base station 114 hosts a surveillance client 136. The image capture device 110 hosts a camera agent 138. The security devices disposed at the location 102A (e.g., devices 104, 106, 108, 110, 112, and 114) may be referred to herein as location-based devices. Any one or more of the location-based devices may include one or more computing devices (e.g., as described below with reference to FIG. 12).

In some examples, the router 116 is a wireless router that is configured to communicate with the location-based devices via communications that comport with a communications standard such as any of the various Institute of Electrical and Electronics Engineers (IEEE) 802.11 standards. As illustrated in FIG. 1, the router 116 is also configured to communicate with the network 118. It should be noted that the router 116 implements a local area network (LAN) within and proximate to the monitored location 102A by way of example only. Other networking technology that involves other computing devices is suitable for use within the monitored location 102A. For instance, in some examples, the base station 114 can receive and forward communication packets transmitted by the image capture device 110 via a personal area network (PAN) protocol, such as BLUETOOTH. Additionally or alternatively, in some examples, the location-based devices communicate directly with one another using any of a variety of standards suitable for point-to-point use, such as any of the IEEE 802.11 standards, PAN standards, etc. In at least one example, the location-based devices can communicate with one another using a sub-GHz wireless networking standard, such as IEEE 802.11ah, Z-WAVE, ZIGBEE, etc.). Other wired, wireless, and mesh network technology and topologies will be apparent with the benefit of this disclosure and are intended to fall within the scope of the examples disclosed herein.

Continuing with the example of FIG. 1, the network 118 can include one or more public and/or private networks that support, for example, IP. The network 118 may include, for example, one or more LANs, one or more PANs, and/or one or more wide area networks (WANs). The LANs can include wired or wireless networks that support various LAN standards, such as a version of IEEE 802.11 and the like. The PANs can include wired or wireless networks that support various PAN standards, such as BLUETOOTH, ZIGBEE, and the like. The WANs can include wired or wireless networks that support various WAN standards, such as the Code Division Multiple Access (CDMA) radio standard, the Global System for Mobiles (GSM) radio standard, and the like. The network 118 connects and enables data communication between the computing devices within the monitored location 102A, the monitoring center environment 120, the data center environment 124, and the customer devices 122. In at least some examples, both the monitoring center environment 120 and the data center environment 124 include network equipment (e.g., similar to the router 116) that is configured to communicate with the network 118 and computing devices collocated with or near the network equipment. It should be noted that, in some examples, the network 118 and the network extant within the monitored location 102A support other communication protocols, such as MQTT or other IoT protocols.

Continuing with the example of FIG. 1, the data center environment 124 can include physical space, communications, cooling, and power infrastructure to support networked operation of computing devices. For instance, this infrastructure can include rack space into which the computing devices are installed, uninterruptible power supplies, cooling plenum and equipment, and networking devices. The data center environment 124 can be dedicated to the security system 100, can be a non-dedicated, commercially available cloud computing service (e.g., MICROSOFT AZURE, AMAZON WEB SERVICES, GOOGLE CLOUD, or the like), or can include a hybrid configuration made up of dedicated and non-dedicated resources. Regardless of its physical or logical configuration, as shown in FIG. 1, the data center environment 124 is configured to host the surveillance service 128 and the transport services 126.

Continuing with the example of FIG. 1, the monitoring center environment 120 can include a plurality of computing devices (e.g., desktop computers) and network equipment (e.g., one or more routers) connected to the computing devices and the network 118. The customer devices 122 can include personal computing devices (e.g., a desktop computer, laptop, tablet, smartphone, or the like) and network equipment (e.g., a router, cellular modem, cellular radio, or the like). As illustrated in FIG. 1, the monitoring center environment 120 is configured to host the monitor interfaces 130 and the customer devices 122 are configured to host the customer interfaces 132.

Continuing with the example of FIG. 1, the devices 104, 106, 110, and 112 are configured to acquire analog signals via sensors incorporated into the devices, generate digital sensor data based on the acquired signals, and communicate (e.g. via a wireless link with the router 116) the sensor data to the base station 114. The type of sensor data generated and communicated by these devices varies along with the type of sensors included in the devices. For instance, the image capture devices 104 and 110 can acquire ambient light, generate frames of image data based on the acquired light, and communicate the frames to the base station 114, the monitor interfaces 130, and/or the customer interfaces 132, although the pixel resolution and frame rate may vary depending on the capabilities of the devices. Where the image capture devices 104 and 110 have sufficient processing capacity and available power, the image capture devices 104 and 110 can process the image frames and transmit messages based on content depicted in the image frames, as described further below. These messages may specify reportable events and may be transmitted in place of, or in addition to, the image frames. Such messages may be sent directly to another location-based device (e.g., via sub-GHz networking) and/or indirectly to any device within the system 100 (e.g., via the router 116). As shown in FIG. 1, the image capture device 104 has a field of view (FOV) that originates proximal to a front door of the location 102A and can acquire images of a walkway, highway, and a space between the location 102A and the highway. The image capture device 110 has an FOV that originates proximal to a bathroom of the location 102A and can acquire images of a living room and dining area of the location 102A. The image capture device 110 can further acquire images of outdoor areas beyond the location 102A through windows 117A and 117B on the right side of the location 102A.

Further, as shown in FIG. 1, in some examples the image capture device 110 is configured to communicate with the surveillance service 128, the monitor interfaces 130, and the customer interfaces 132 separately from the surveillance client 136 via execution of the camera agent 138. These communications can include sensor data generated by the image capture device 110 and/or commands to be executed by the image capture device 110 sent by the surveillance service 128, the monitor interfaces 130, and/or the customer interfaces 132. The commands can include, for example, requests for interactive communication sessions in which monitoring personnel and/or customers interact with the image capture device 110 via the monitor interfaces 130 and the customer interfaces 132. These interactions can include requests for the image capture device 110 to transmit additional sensor data and/or requests for the image capture device 110 to render output via a user interface (e.g., the user interface 412 of FIGS. 4B & 4C). This output can include audio and/or video output.

Continuing with the example of FIG. 1, the contact sensor assembly 106 includes a sensor that can detect the presence or absence of a magnetic field generated by a magnet when the magnet is proximal to the sensor. When the magnetic field is present, the contact sensor assembly 106 generates Boolean sensor data specifying a closed state. When the magnetic field is absent, the contact sensor assembly 106 generates Boolean sensor data specifying an open state. In either case, the contact sensor assembly 106 can communicate to the base station 114, sensor data indicating whether the front door of the location 102A is open or closed. The motion sensor assembly 112 can include an audio emission device that can radiate sound (e.g., ultrasonic) waves and an audio sensor that can acquire reflections of the waves. When the audio sensor detects the reflection because no objects are in motion within the space monitored by the audio sensor, the motion sensor assembly 112 generates Boolean sensor data specifying a still state. When the audio sensor does not detect a reflection because an object is in motion within the monitored space, the motion sensor assembly 112 generates Boolean sensor data specifying an alarm state. In either case, the motion sensor assembly 112 can communicate the sensor data to the base station 114. It should be noted that the specific sensing modalities described above are not limiting to the present disclosure. For instance, as one of many potential examples, the motion sensor assembly 112 can base its operation on acquisition of sensor data indicating changes in temperature rather than changes in reflected sound waves.

Continuing with the example of FIG. 1, the keypad 108 is configured to interact with a user and interoperate with the other location-based devices in response to interactions with the user. For instance, in some examples, the keypad 108 is configured to receive input from a user that specifies one or more commands and to communicate the specified commands to one or more addressed processes. These addressed processes can include processes implemented by one or more of the location-based devices and/or one or more of the monitor interfaces 130 or the surveillance service 128. The commands can include, for example, codes that authenticate the user as a resident of the location 102A and/or codes that request activation or deactivation of one or more of the location-based devices. Alternatively or additionally, in some examples, the keypad 108 includes a user interface (e.g., a tactile interface, such as a set of physical buttons or a set of virtual buttons on a touchscreen) configured to interact with a user (e.g., receive input from and/or render output to the user). Further still, in some examples, the keypad 108 can receive and respond to the communicated commands and render the responses via the user interface as visual or audio output.

Continuing with the example of FIG. 1, the base station 114 is configured to interoperate with the other location-based devices to provide local command and control and store-and-forward functionality via execution of the surveillance client 136. In some examples, to implement store-and-forward functionality, the base station 114, through execution of the surveillance client 136, receives sensor data, packages the data for transport, and stores the packaged sensor data in local memory for subsequent communication. This communication of the packaged sensor data can include, for instance, transmission of the packaged sensor data as a payload of a message to one or more of the transport services 126 when a communication link to the transport services 126 via the network 118 is operational. In some examples, packaging the sensor data can include filtering the sensor data and/or generating one or more summaries (maximum values, minimum values, average values, changes in values since the previous communication of the same, etc.) of multiple sensor readings. To implement local command and control functionality, the base station 114 executes, under control of the surveillance client 136, a variety of programmatic operations in response to various events. Examples of these events can include reception of commands from the keypad 108, reception of commands from one of the monitor interfaces 130 or the customer interface application 132 via the network 118, or detection of the occurrence of a scheduled event. The programmatic operations executed by the base station 114 under control of the surveillance client 136 can include activation or deactivation of one or more of the devices 104, 106, 108, 110, and 112; sounding of an alarm; reporting an event to the surveillance service 128; and communicating location data to one or more of the transport services 126 to name a few operations. The location data can include data specifying sensor readings (sensor data), configuration data of any of the location-based devices, commands input and received from a user (e.g., via the keypad 108 or a customer interface 132), or data derived from one or more of these data types (e.g., filtered sensor data, summarizations of sensor data, event data specifying an event detected at the location via the sensor data, etc.).

Continuing with the example of FIG. 1, the transport services 126 are configured to securely, reliably, and efficiently exchange messages between processes implemented by the location-based devices and processes implemented by other devices in the system 100. These other devices can include the customer devices 122, devices disposed in the data center environment 124, and/or devices disposed in the monitoring center environment 120. In some examples, the transport services 126 are also configured to parse messages from the location-based devices to extract payloads included therein and store the payloads and/or data derived from the payloads within one or more data stores hosted in the data center environment 124. The data housed in these data stores may be subsequently accessed by, for example, the surveillance service 128, the monitor interfaces 130, and the customer interfaces 132.

In certain examples, the transport services 126 expose and implement one or more application programming interfaces (APIs) that are configured to receive, process, and respond to calls from processes (e.g., the surveillance client 136) implemented by base stations (e.g., the base station 114) and/or processes (e.g., the camera agent 138) implemented by other devices (e.g., the image capture device 110). Individual instances of a transport service within the transport services 126 can be associated with and specific to certain manufactures and models of location-based monitoring equipment (e.g., SIMPLISAFE equipment, RING equipment, etc.). The APIs can be implemented using a variety of architectural styles and interoperability standards. For instance, in one example, the API is a web services interface implemented using a representational state transfer (REST) architectural style. In this example, API calls are encoded in Hypertext Transfer Protocol (HTTP) along with JavaScript Object Notation (JSON) and/or extensible markup language (XML). These API calls are addressed to one or more uniform resource locators (URLs) that are API endpoints monitored by the transport services 126. In some examples, portions of the HTTP communications are encrypted to increase security. Alternatively or additionally, in some examples, the API is implemented as an MQTT broker that receives messages and transmits responsive messages to MQTT clients hosted by the base stations and/or the other devices. Alternatively or additionally, in some examples, the API is implemented using simple file transfer protocol commands. Thus, the transport services 126 are not limited to a particular protocol or architectural style. It should be noted that, in at least some examples, the transport services 126 can transmit one or more API calls to location-based devices to request data from, or an interactive communication session with, the location-based devices.

Continuing with the example of FIG. 1, the surveillance service 128 is configured to control overall logical setup and operation of the system 100. As such, the surveillance service 128 can interoperate with the transport services 126, the monitor interfaces 130, the customer interfaces 132, and any of the location-based devices. In some examples, the surveillance service 128 is configured to monitor data from a variety of sources for reportable events (e.g., a break-in event) and, when a reportable event is detected, notify one or more of the monitor interfaces 130 and/or the customer interfaces 132 of the reportable event. In some examples, the surveillance service 128 is also configured to maintain state information regarding the location 102A. This state information can indicate, for instance, whether the location 102A is safe or under threat. In certain examples, the surveillance service 128 is configured to change the state information to indicate that the location 102A is safe only upon receipt of a communication indicating a clear event (e.g., rather than making such a change in response to discontinuation of reception of break-in events). This feature can prevent a "crash and smash" robbery from being successfully executed. Further example processes that the surveillance service 128 is configured to execute are described below with reference to FIGS. 5 and 6.

Continuing with the example of FIG. 1, individual monitor interfaces 130 are configured to control computing device interaction with monitoring personnel and to execute a variety of programmatic operations in response to the interactions. For instance, in some examples, the monitor interface 130 controls its host device to provide information regarding reportable events detected at monitored locations, such as the location 102A, to monitoring personnel. Such events can include, for example, movement or an alarm condition generated by one or more of the location-based devices. Alternatively or additionally, in some examples, the monitor interface 130 controls its host device to interact with a user to configure features of the system 100. Further example processes that the monitor interface 130 is configured to execute are described below with reference to FIG. 6. It should be noted that, in at least some examples, the monitor interfaces 130 are browser-based applications served to the monitoring center environment 120 by webservers included within the data center environment 124. These webservers may be part of the surveillance service 128, in certain examples.

Continuing with the example of FIG. 1, individual customer interfaces 132 are configured to control computing device interaction with a customer and to execute a variety of programmatic operations in response to the interactions. For instance, in some examples, the customer interface 132 controls its host device to provide information regarding reportable events detected at monitored locations, such as the location 102A, to the customer. Such events can include, for example, an alarm condition generated by one or more of the location-based devices. Alternatively or additionally, in some examples, the customer interface 132 is configured to process input received from the customer to activate or deactivate one or more of the location-based devices. Further still, in some examples, the customer interface 132 configures features of the system 100 in response to input from a user. Further example processes that the customer interface 132 is configured to execute are described below with reference to FIG. 6.

Figures 2, 3:
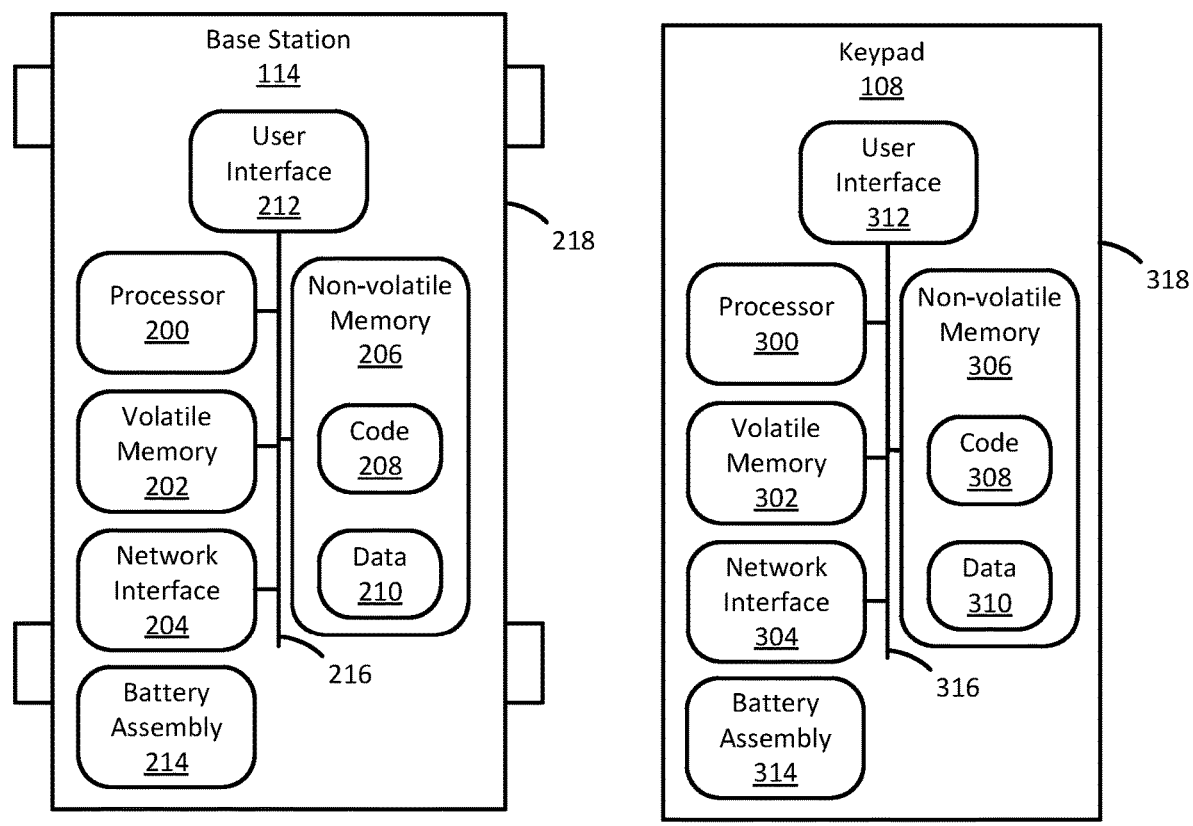
FIG. 2 is a schematic diagram of a base station, according to some examples described herein.
FIG. 3 is a schematic diagram of a keypad, according to some examples described herein.

Turning now to FIG. 2, an example base station 114 is schematically illustrated. As shown in FIG. 2, the base station 114 includes at least one processor 200, volatile memory 202, non-volatile memory 206, at least one network interface 204, a user interface 212, a battery assembly 214, and an interconnection mechanism 216. The non-volatile memory 206 stores executable code 208 and includes a data store 210. In some examples illustrated by FIG. 2, the features of the base station 114 enumerated above are incorporated within, or are a part of, a housing 218.

In some examples, the non-volatile (non-transitory) memory 206 includes one or more read-only memory (ROM) chips; one or more hard disk drives or other magnetic or optical storage media; one or more solid state drives (SSDs), such as a flash drive or other solid-state storage media; and/or one or more hybrid magnetic and SSDs. In certain examples, the code 208 stored in the non-volatile memory can include an operating system and one or more applications or programs that are configured to execute under the operating system. Alternatively or additionally, the code 208 can include specialized firmware and embedded software that is executable without dependence upon a commercially available operating system. Regardless, execution of the code 208 can implement the surveillance client 136 of FIG. 1 and can result in manipulated data that is a part of the data store 210.

Continuing with the example of FIG. 2, the processor 200 can include one or more programmable processors to execute one or more executable instructions, such as a computer program specified by the code 208, to control the operations of the base station 114. As used herein, the term "processor" describes circuitry that executes a function, an operation, or a sequence of operations. The function, operation, or sequence of operations can be hard coded into the circuitry or soft coded by way of instructions held in a memory device (e.g., the volatile memory 202) and executed by the circuitry. In some examples, the processor 200 is a digital processor, but the processor 200 can be analog, digital, or mixed. As such, the processor 200 can execute the function, operation, or sequence of operations using digital values and/or using analog signals. In some examples, the processor 200 can be embodied in one or more application specific integrated circuits (ASICs), microprocessors, digital signal processors (DSPs), graphics processing units (GPUs), neural processing units (NPUs), microcontrollers, field programmable gate arrays (FPGAs), programmable logic arrays (PLAs), or multicore processors. Examples of the processor 200 that are multicore can provide functionality for parallel, simultaneous execution of instructions or for parallel, simultaneous execution of one instruction on more than one piece of data.

Continuing with the example of FIG. 2, prior to execution of the code 208 the processor 200 can copy the code 208 from the non-volatile memory 206 to the volatile memory 202. In some examples, the volatile memory 202 includes one or more static or dynamic random access memory (RAM) chips and/or cache memory (e.g. memory disposed on a silicon die of the processor 200). Volatile memory 202 can offer a faster response time than a main memory, such as the non-volatile memory 206.

Through execution of the code 208, the processor 200 can control operation of the network interface 204. For instance, in some examples, the network interface 204 includes one or more physical interfaces (e.g., a radio, an ethernet port, a universal serial bus (USB) port, etc.) and a software stack including drivers and/or other code 208 that is configured to communicate with the one or more physical interfaces to support one or more LAN, PAN, and/or WAN standard communication protocols. The communication protocols can include, for example, transmission control protocol (TCP), user datagram protocol (UDP), HTTP, and MQTT among others. As such, the network interface 204 enables the base station 114 to access and communicate with other computing devices (e.g., the location-based devices) via a computer network (e.g., the LAN established by the router 116 of FIG. 1, the network 118 of FIG. 1, and/or a point-to-point connection). For instance, in at least one example, the network interface 204 utilizes sub-GHz wireless networking to transmit messages to other location-based devices. These messages can include wake messages to request streams of sensor data, alarm messages to trigger alarm responses, or other messages to initiate other operations. Bands that the network interface 204 may utilize for sub-GHz wireless networking include, for example, an 868 MHz band and/or a 915 MHz band. Use of sub-GHz wireless networking can improve operable communication distances and/or reduce power consumed to communicate.

Through execution of the code 208, the processor 200 can control operation of the user interface 212. For instance, in some examples, the user interface 212 includes user input and/or output devices (e.g., a keyboard, a mouse, a touchscreen, a display, a speaker, a camera, an accelerometer, a biometric scanner, an environmental sensor, etc.) and a software stack including drivers and/or other code 208 that is configured to communicate with the user input and/or output devices. For instance, the user interface 212 can be implemented by a customer device 122 hosting a mobile application (e.g., a customer interface 132). The user interface 212 enables the base station 114 to interact with users to receive input and/or render output. This rendered output can include, for instance, one or more graphical user interfaces (GUIs) including one or more controls configured to display output and/or receive input. The input can specify values to be stored in the data store 210. The output can indicate values stored in the data store 210. It should be noted that, in some examples, parts of the user interface 212 are accessible and/or visible as part of, or through, the housing 218. These parts of the user interface 212 can include, for example, one or more light-emitting diodes (LEDs). Alternatively or additionally, in some examples, the user interface 212 includes a 95 db siren that the processor 200 sounds to indicate that a break-in event has been detected.

Continuing with the example of FIG. 2, the various features of the base station 114 described above can communicate with one another via the interconnection mechanism 216. In some examples, the interconnection mechanism 216 includes a communications bus. In addition, in some examples, the battery assembly 214 is configured to supply operational power to the various features of the base station 114 described above. In some examples, the battery assembly 214 includes at least one rechargeable battery (e.g., one or more NiMH or lithium batteries). In some examples, the rechargeable battery has a runtime capacity sufficient to operate the base station 114 for 24 hours or longer while the base station 114 is disconnected from or otherwise not receiving line power. Alternatively or additionally, in some examples, the battery assembly 214 includes power supply circuitry to receive, condition, and distribute line power to both operate the base station 114 and recharge the rechargeable battery. The power supply circuitry can include, for example, a transformer and a rectifier, among other circuitry, to convert AC line power to DC device and recharging power.

Turning now to FIG. 3, an example keypad 108 is schematically illustrated. As shown in FIG. 3, the keypad 108 includes at least one processor 300, volatile memory 302, non-volatile memory 306, at least one network interface 304, a user interface 312, a battery assembly 314, and an interconnection mechanism 316. The non-volatile memory 306 stores executable code 308 and a data store 310. In some examples illustrated by FIG. 3, the features of the keypad 108 enumerated above are incorporated within, or are a part of, a housing 318.

In some examples, the respective descriptions of the processor 200, the volatile memory 202, the non-volatile memory 206, the interconnection mechanism 216, and the battery assembly 214 with reference to the base station 114 are applicable to the processor 300, the volatile memory 302, the non-volatile memory 306, the interconnection mechanism 316, and the battery assembly 314 with reference to the keypad 108. As such, those descriptions will not be repeated.

Continuing with the example of FIG. 3, through execution of the code 308, the processor 300 can control operation of the network interface 304. In some examples, the network interface 304 includes one or more physical interfaces (e.g., a radio, an ethernet port, a USB port, etc.) and a software stack including drivers and/or other code 308 that is configured to communicate with the one or more physical interfaces to support one or more LAN, PAN, and/or WAN standard communication protocols. These communication protocols can include, for example, TCP, UDP, HTTP, and MQTT among others. As such, the network interface 304 enables the keypad 108 to access and communicate with other computing devices (e.g., the other location-based devices) via a computer network (e.g., the LAN established by the router 116 and/or a point-to-point connection).

Continuing with the example of FIG. 3, through execution of the code 308, the processor 300 can control operation of the user interface 312. In some examples, the user interface 312 includes user input and/or output devices (e.g., physical keys arranged as a keypad, a touchscreen, a display, a speaker, a camera, a biometric scanner, an environmental sensor, etc.) and a software stack including drivers and/or other code 308 that is configured to communicate with the user input and/or output devices. As such, the user interface 312 enables the keypad 108 to interact with users to receive input and/or render output. This rendered output can include, for instance, one or more GUIs including one or more controls configured to display output and/or receive input. The input can specify values to be stored in the data store 310. The output can indicate values stored in the data store 310. It should be noted that, in some examples, parts of the user interface 312 (e.g., one or more LEDs) are accessible and/or visible as part of, or through, the housing 318.

In some examples, devices like the keypad 108, which rely on user input to trigger an alarm condition, may be included within a security system, such as the security system 100 of FIG. 1. Examples of such devices include dedicated key fobs and panic buttons. These dedicated security devices provide a user with a simple, direct way to trigger an alarm condition, which can be particularly helpful in times of duress.

Figure 4A:
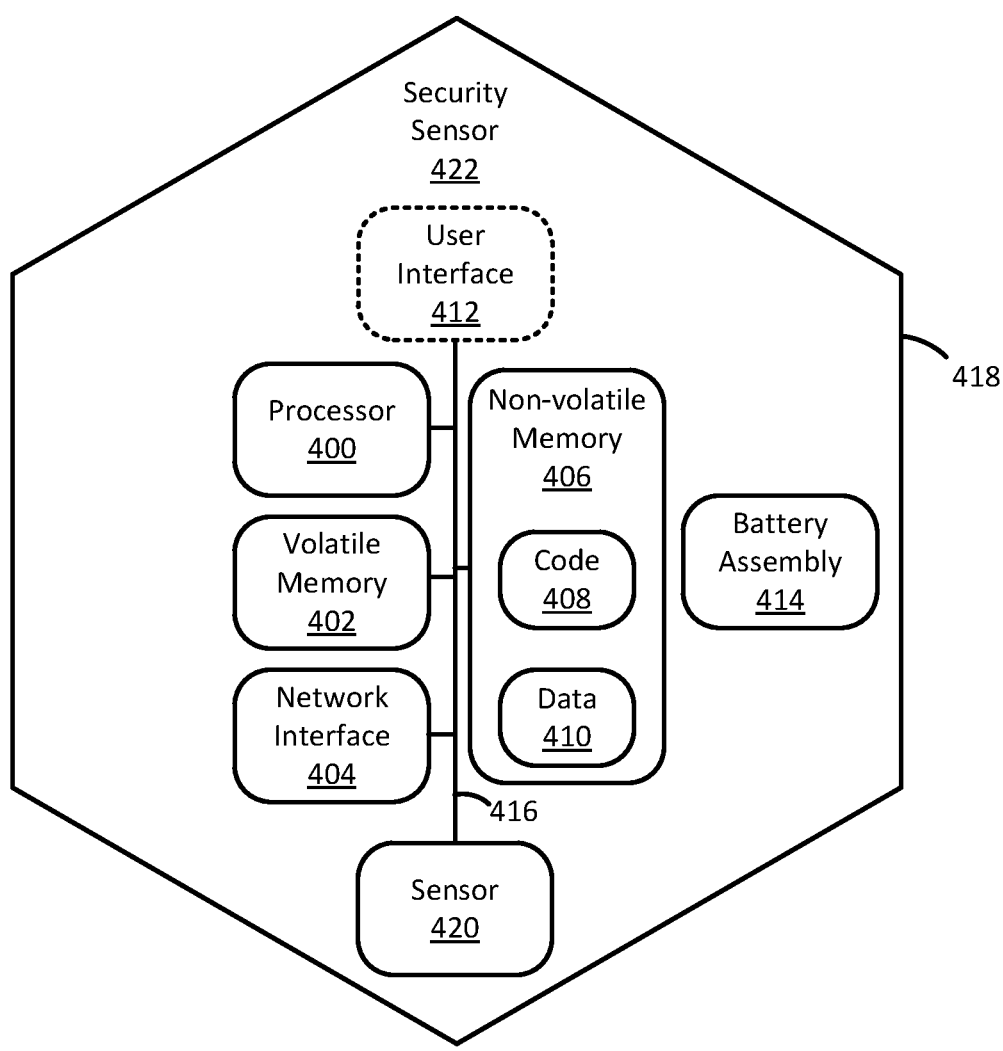
FIG. 4A is a schematic diagram of a security sensor, according to some examples described herein.

Turning now to FIG. 4A, an example security sensor 422 is schematically illustrated. Particular configurations of the security sensor 422 (e.g., the image capture devices 104 and 110, the motion sensor assembly 112, and the contact sensor assemblies 106) are illustrated in FIG. 1 and described above. Other examples of security sensors 422 include glass break sensors, carbon monoxide sensors, smoke detectors, water sensors, temperature sensors, and door lock sensors, to name a few. As shown in FIG. 4A, the security sensor 422 includes at least one processor 400, volatile memory 402, non-volatile memory 406, at least one network interface 404, a battery assembly 414, an interconnection mechanism 416, and at least one sensor assembly 420. The non-volatile memory 406 stores executable code 408 and a data store 410. Some examples include a user interface 412. In certain examples illustrated by FIG. 4A, the features of the security sensor 422 enumerated above are incorporated within, or are a part of, a housing 418.

In some examples, the respective descriptions of the processor 200, the volatile memory 202, the non-volatile memory 206, the interconnection mechanism 216, and the battery assembly 214 with reference to the base station 114 are applicable to the processor 400, the volatile memory 402, the non-volatile memory 406, the interconnection mechanism 416, and the battery assembly 414 with reference to the security sensor 422. As such, those descriptions will not be repeated.

Continuing with the example of FIG. 4A, through execution of the code 408, the processor 400 can control operation of the network interface 404. In some examples, the network interface 404 includes one or more physical interfaces (e.g., a radio (including an antenna), an ethernet port, a USB port, etc.) and a software stack including drivers and/or other code 408 that is configured to communicate with the one or more physical interfaces to support one or more LAN, PAN, and/or WAN standard communication protocols. The communication protocols can include, for example, TCP, UDP, HTTP, and MQTT among others. As such, the network interface 404 enables the security sensor 422 to access and communicate with other computing devices (e.g., the other location-based devices) via a computer network (e.g., the LAN established by the router 116 and/or a point-to-point connection). For instance, in at least one example, when executing the code 408, the processor 400 controls the network interface to stream (e.g., via UDP) sensor data acquired from the sensor assembly 420 to the base station 114. Alternatively or additionally, in at least one example, through execution of the code 408, the processor 400 can control the network interface 404 to enter a power conservation mode by powering down a 2.4 GHz radio and powering up a sub-GHz radio that are both included in the network interface 404. In this example, through execution of the code 408, the processor 400 can control the network interface 404 to enter a streaming or interactive mode by powering up a 2.4 GHz radio and powering down a sub-GHz radio, for example, in response to receiving a wake signal from the base station via the sub-GHz radio.

Continuing with the example of FIG. 4A, through execution of the code 408, the processor 400 can control operation of the user interface 412. In some examples, the user interface 412 includes user input and/or output devices (e.g., physical buttons, a touchscreen, a display, a speaker, a camera, an accelerometer, a biometric scanner, an environmental sensor, one or more LEDs, etc.) and a software stack including drivers and/or other code 408 that is configured to communicate with the user input and/or output devices. As such, the user interface 412 enables the security sensor 422 to interact with users to receive input and/or render output. This rendered output can include, for instance, one or more GUIs including one or more controls configured to display output and/or receive input. The input can specify values to be stored in the data store 410. The output can indicate values stored in the data store 410. It should be noted that, in some examples, parts of the user interface 412 are accessible and/or visible as part of, or through, the housing 418.

Continuing with the example of FIG. 4A, the sensor assembly 420 can include one or more types of sensors, such as the sensors described above with reference to the image capture devices 104 and 110, the motion sensor assembly 112, and the contact sensor assembly 106 of FIG. 1, or other types of sensors. For instance, in at least one example, the sensor assembly 420 includes an image sensor (e.g., a charge-coupled device or an active-pixel sensor) and/or a temperature or thermographic sensor (e.g., an active and/or passive infrared (PIR) sensor). Regardless of the type of sensor or sensors housed, the processor 400 can (e.g., via execution of the code 408) acquire sensor data from the housed sensor and stream the acquired sensor data to the processor 400 for communication to the base station.

It should be noted that, in some examples of the devices 108 and 422, the operations executed by the processors 300 and 400 while under control of respective control of the code 308 and 408 may be hardcoded and/or implemented in hardware, rather than as a combination of hardware and software. Moreover, execution of the code 408 can implement the camera agent 138 of FIG. 1 and can result in manipulated data that is a part of the data store 410.

Figure 4B:
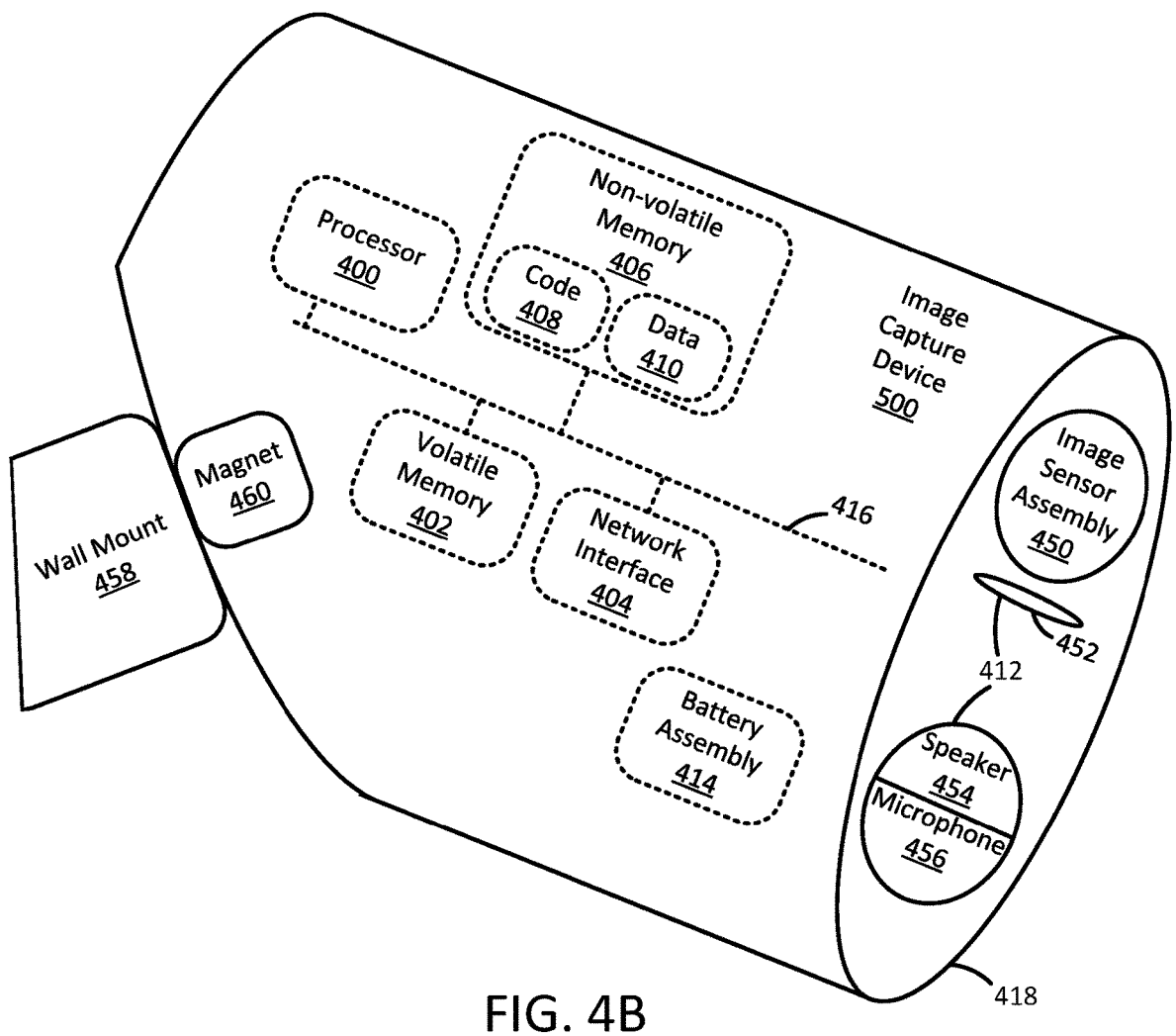
FIG. 4B is a schematic diagram of an image capture device, according to some examples described herein.

Turning now to FIG. 4B, an example image capture device 500 is schematically illustrated. Particular configurations of the image capture device 500 (e.g., the image capture devices 104 and 110) are illustrated in FIG. 1 and described above. As shown in FIG. 4B, the image capture device 500 includes at least one processor 400, volatile memory 402, non-volatile memory 406, at least one network interface 404, a battery assembly 414, and an interconnection mechanism 416. These features of the image capture device 500 are illustrated in dashed lines to indicate that they reside within a housing 418. The non-volatile memory 406 stores executable code 408 and a data store 410.

Some examples further include an image sensor assembly 450, a light 452, a speaker 454, a microphone system 456, a wall mount 458, and a magnet 460. The image sensor assembly 450 may include a lens and an image sensor (e.g., a charge-coupled device or an active-pixel sensor) and/or a temperature or thermographic sensor (e.g., an active and/or passive infrared (PIR) sensor). The light 452 may include a light emitting diode (LED), such as a red-green-blue emitting LED. The light 452 may also include an infrared emitting diode in some examples. The speaker 454 may include a transducer configured to emit sound in the range of 60 dB to 80 dB or louder. Further, in some examples, the speaker 454 can include a siren configured to emit sound in the range of 70 dB to 90 db or louder. The microphone system 456 may include a micro electro-mechanical system (MEMS) microphone. The wall mount 458 may include a mounting bracket, configured to accept screws or other fasteners that adhere the bracket to a wall, and a cover configured to mechanically couple to the mounting bracket. In some examples, the cover is composed of a magnetic material, such as aluminum or stainless steel, to enable the magnet 460 to magnetically couple to the wall mount 458, thereby holding the image capture device 500 in place.

In some examples, the respective descriptions of the processor 400, the volatile memory 402, the network interface 404, the non-volatile memory 406, the code 408 with respect to the network interface 404, the interconnection mechanism 416, and the battery assembly 414 with reference to the security sensor 422 are applicable to these same features with reference to the image capture device 500. As such, those descriptions will not be repeated here.

Continuing with the example of FIG. 4B, through execution of the code 408, the processor 400 can control operation of the image sensor assembly 450, the light 452, the speaker 454, and the microphone system 456. For instance, in at least one example, when executing the code 408, the processor 400 controls the image sensor assembly 450 to acquire sensor data, in the form of image data, to be streamed to the base station 114 (or one of the processes 130, 128, or 132 of FIG. 1) via the network interface 404. Alternatively or additionally, in at least one example, through execution of the code 408, the processor 400 controls the light 452 to emit light so that the image sensor assembly 450 collects sufficient reflected light to compose the image data. Further, in some examples, through execution of the code 408, the processor 400 controls the speaker 454 to emit sound. This sound may be locally generated (e.g., a sonic alarm via the siren) or streamed from the base station 114 (or one of the processes 130, 128 or 132 of FIG. 1) via the network interface 404 (e.g., utterances from the user or monitoring personnel). Further still, in some examples, through execution of the code 408, the processor 400 controls the microphone system 456 to acquire sensor data in the form of sound for streaming to the base station 114 (or one of the processes 130, 128 or 132 of FIG. 1) via the network interface 404.

It should be appreciated that in the example of FIG. 4B, the light 452, the speaker 454, and the microphone system 456 implement an instance of the user interface 412 of FIG. 4A. It should also be appreciated that the image sensor assembly 450 and the light 452 implement an instance of the sensor assembly 420 of FIG. 4A. As such, the image capture device 500 illustrated in FIG. 4B is at least one example of the security sensor 422 illustrated in FIG. 4A. The image capture device 500 may be a battery-powered outdoor sensor configured to be installed and operated in an outdoor environment, such as outside a home, office, store, or other commercial or residential building, for example.

Figure 4C:
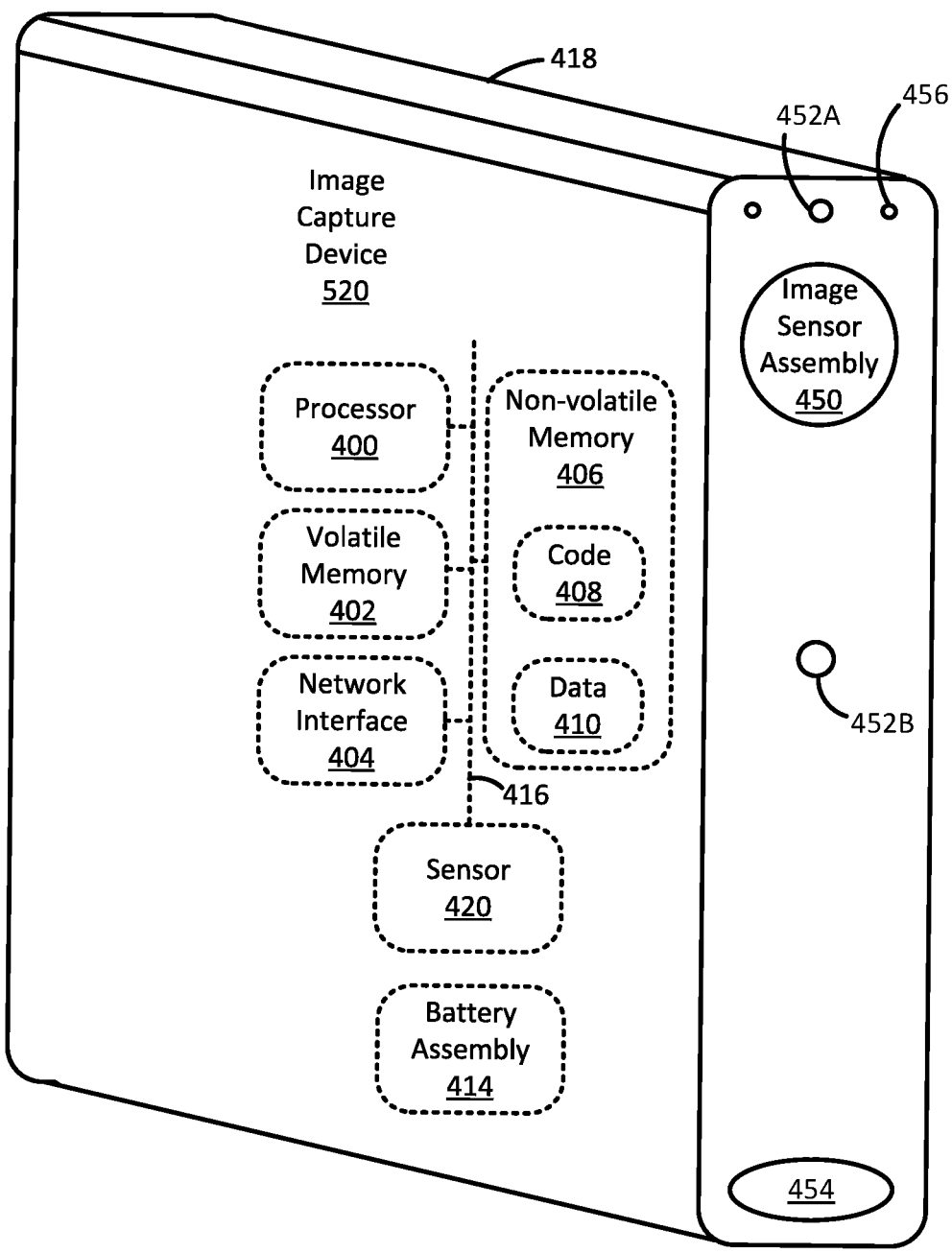
FIG. 4C is a schematic diagram of another image capture device, according to some examples described herein.

Turning now to FIG. 4C, another example image capture device 520 is schematically illustrated. Particular configurations of the image capture device 520 (e.g., the image capture devices 104 and 110) are illustrated in FIG. 1 and described above. As shown in FIG. 4C, the image capture device 520 includes at least one processor 400, volatile memory 402, non-volatile memory 406, at least one network interface 404, a battery assembly 414, and an interconnection mechanism 416. These features of the image capture device 520 are illustrated in dashed lines to indicate that they reside within a housing 418. The non-volatile memory 406 stores executable code 408 and a data store 410. The image capture device 520 further includes an image sensor assembly 450, a speaker 454, and a microphone system 456 as described above with reference to the image capture device 500 of FIG. 4B.

In some examples, the image capture device 520 further includes lights 452A and 452B. The light 452A may include a light emitting diode (LED), such as a red-green-blue emitting LED. The light 452B may also include an infrared emitting diode to enable night vision in some examples.

It should be appreciated that in the example of FIG. 4C, the lights 452A and 452B, the speaker 454, and the microphone system 456 implement an instance of the user interface 412 of FIG. 4A. It should also be appreciated that the image sensor assembly 450 and the light 452 implement an instance of the sensor assembly 420 of FIG. 4A. As such, the image capture device 520 illustrated in FIG. 4C is at least one example of the security sensor 422 illustrated in FIG. 4A. The image capture device 520 may be a battery-powered indoor sensor configured to be installed and operated in an indoor environment, such as within a home, office, store, or other commercial or residential building, for example.

Figure 5:
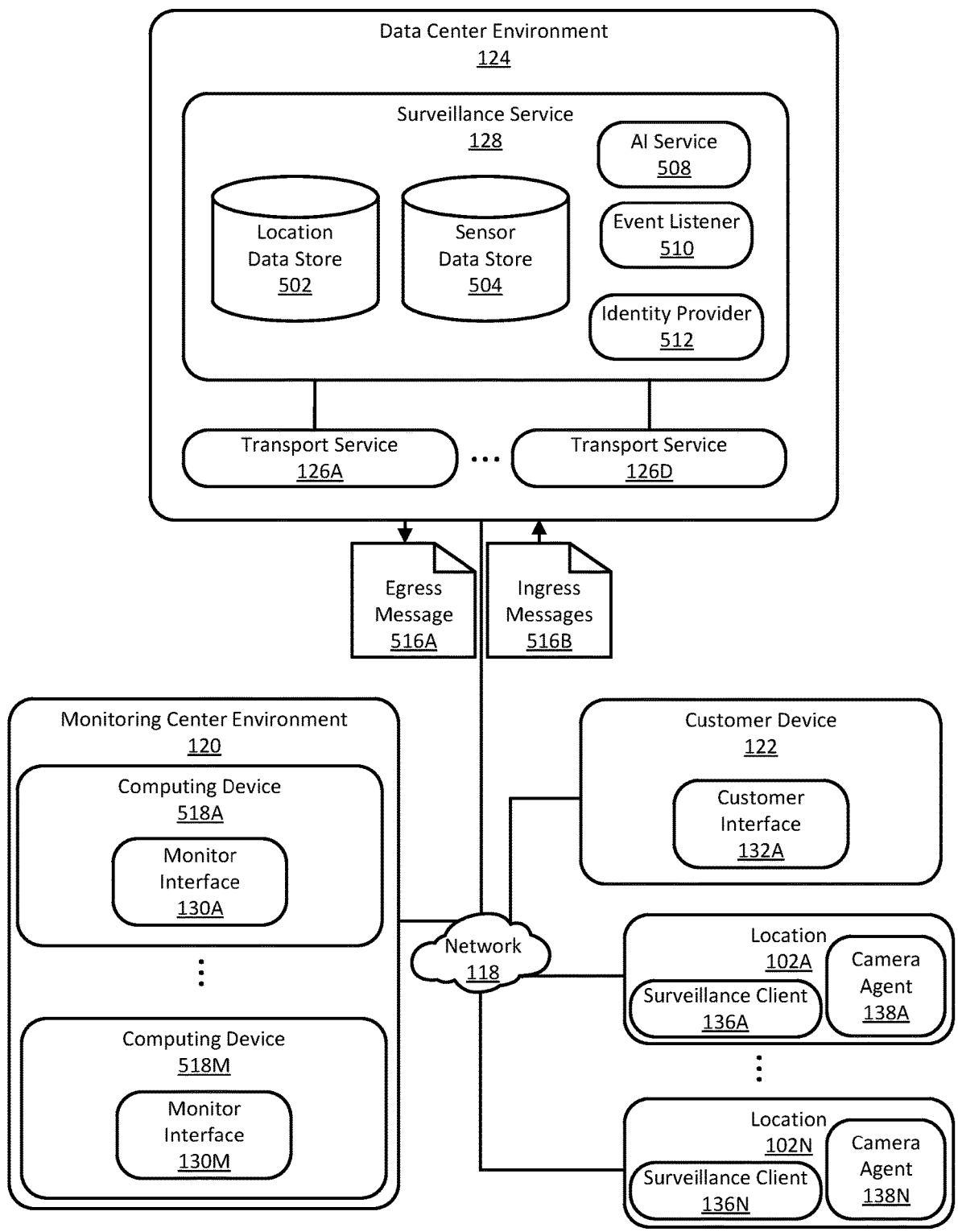
FIG. 5 is a schematic diagram of a data center environment, a monitoring center environment, and a customer device, according to some examples described herein.

Turning now to FIG. 5, aspects of the data center environment 124 of FIG. 1, the monitoring center environment 120 of FIG. 1, one of the customer devices 122 of FIG. 1, the network 118 of FIG. 1, and a plurality of monitored locations 102A through 102N of FIG. 1 (collectively referred to as the locations 102) are schematically illustrated. As shown in FIG. 5, the data center environment 124 hosts the surveillance service 128 and the transport services 126 (individually referred to as the transport services 126A through 126D). The surveillance service 128 includes a location data store 502, a sensor data store 504, an artificial intelligence (AI) service 508, an event listening service 510, and an identity provider 512. The monitoring center environment 120 includes computing devices 518A through 518M (collectively referred to as the computing devices 518) that host monitor interfaces 130A through 130M. Individual locations 102A through 102N include base stations (e.g., the base station 114 of FIG. 1, not shown) that host the surveillance clients 136A through 136N (collectively referred to as the surveillance clients 136) and image capture devices (e.g., the image capture device 110 of FIG. 1, not shown) that host the software camera agents 138A through 138N (collectively referred to as the camera agents 138).

As shown in FIG. 5, the transport services 126 are configured to process ingress messages 516B from the customer interface 132A, the surveillance clients 136, the camera agents 138, and/or the monitor interfaces 130. The transport services 126 are also configured to process egress messages 516A addressed to the customer interface 132A, the surveillance clients 136, the camera agents 138, and the monitor interfaces 130. The location data store 502 is configured to store, within a plurality of records, location data in association with identifiers of customers for whom the location is monitored. For example, the location data may be stored in a record with an identifier of a customer and/or an identifier of the location to associate the location data with the customer and the location. The sensor data store 504 is configured to store, within a plurality of records, sensor data (e.g., one or more frames of image data) separately from other location data but in association with identifiers of locations and timestamps at which the sensor data was acquired. In some examples, the sensor data store 504 is optional and may be use, for example, where the sensor data house therein has specialized storage or processing requirements.

Continuing with the example of FIG. 5, the AI service 508 is configured to process sensor data (e.g., images and/or sequences of images) to identify movement, human faces, and other features within the sensor data. The event listening service 510 is configured to scan location data transported via the ingress messages 516B for event data and, where event data is identified, execute one or more event handlers to process the event data. In some examples, the event handlers can include an event reporter that is configured to identify reportable events and to communicate messages specifying the reportable events to one or more recipient processes (e.g., a customer interface 132 and/or a monitor interface 130). In some examples, the event listening service 510 can interoperate with the AI service 508 to identify events from sensor data. The identity provider 512 is configured to receive, via the transport services 126, authentication requests from the surveillance clients 136 or the camera agents 138 that include security credentials. When the identity provider 512 can authenticate the security credentials in a request (e.g., via a validation function, cross-reference look-up, or some other authentication process), the identity provider 512 can communicate a security token in response to the request. A surveillance client 136 or a camera agent 138 can receive, store, and include the security token in subsequent ingress messages 516B, so that the transport service 126A is able to securely process (e.g., unpack/parse) the packages included in the ingress messages 516B to extract the location data prior to passing the location data to the surveillance service 128.

Continuing with the example of FIG. 5, the transport services 126 are configured to receive the ingress messages 516B, verify the authenticity of the messages 516B, parse the messages 516B, and extract the location data encoded therein prior to passing the location data to the surveillance service 128 for processing. This location data can include any of the location data described above with reference to FIG. 1. Individual transport services 126 may be configured to process ingress messages 516B generated by location-based monitoring equipment of a particular manufacturer and/or model. The surveillance clients 136 and the camera agents 138 are configured to generate and communicate, to the surveillance service 128 via the network 118, ingress messages 516B that include packages of location data based on sensor information received at the locations 102.

Continuing with the example of FIG. 5, the computing devices 518 are configured to host the monitor interfaces 130. In some examples, individual monitor interfaces 130A-130M are configured to render GUIs including one or more image frames and/or other sensor data. In certain examples, the customer device 122 is configured to host the customer interface 132. In some examples, customer interface 132 is configured to render GUIs including one or more image frames and/or other sensor data. Additional features of the monitor interfaces 130 and the customer interface 132 are described further below with reference to FIG. 6.

Figure 6:
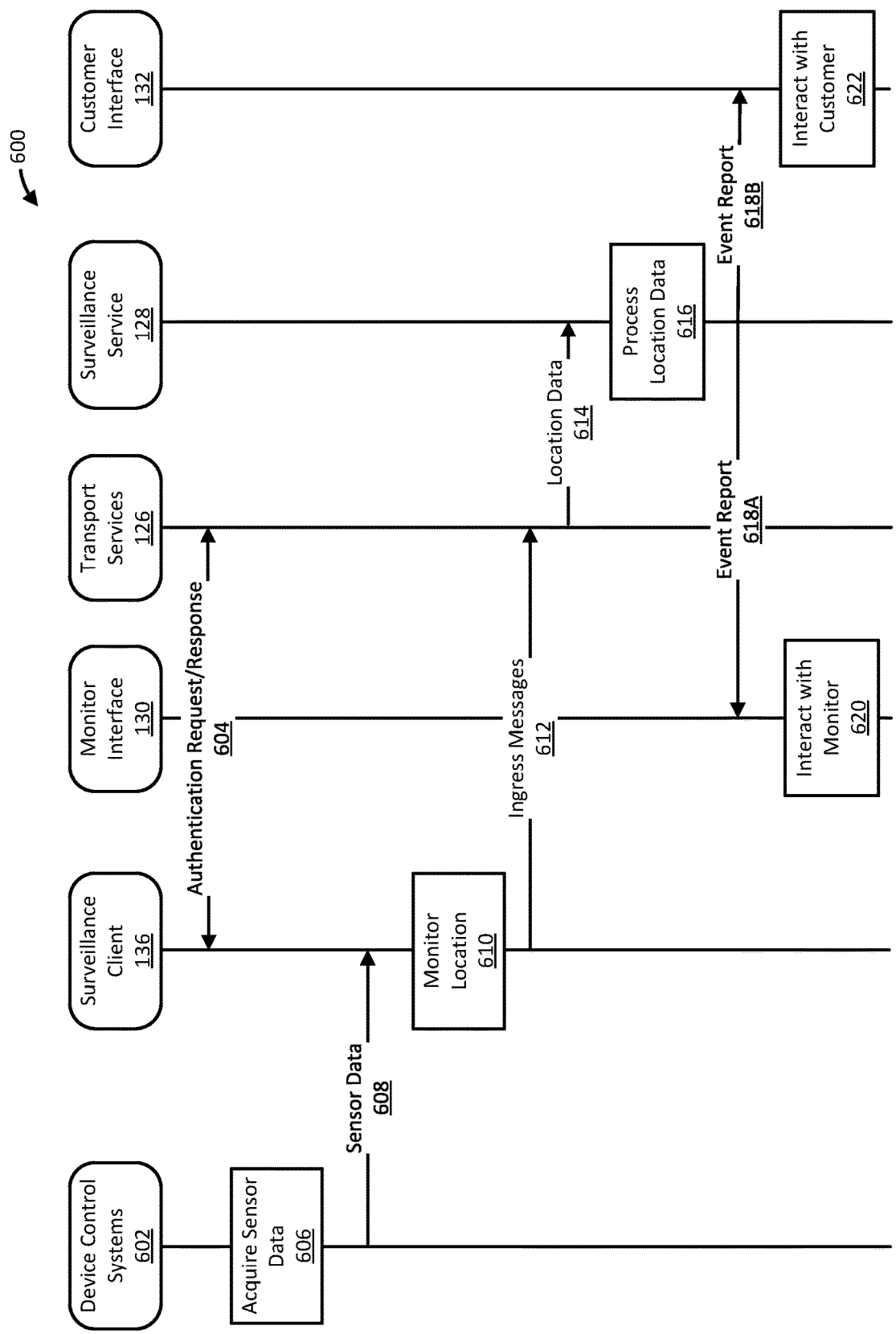
FIG. 6 is a sequence diagram of a monitoring process, according to some examples described herein.

Turning now to FIG. 6, a monitoring process 600 is illustrated as a sequence diagram. The process 600 can be executed, in some examples, by a security system (e.g., the security system 100 of FIG. 1). More specifically, in some examples, at least a portion of the process 600 is executed by the location-based devices under the control of device control system (DCS) code (e.g., either the code 308 or 408) implemented by at least one processor (e.g., either of the processors 300 or 400 of FIGS. 3-4C). The DCS code can include, for example, a camera agent (e.g., the camera agent 138 of FIG. 1). At least a portion of the process 600 is executed by a base station (e.g., the base station 114 of FIG. 1) under control of a surveillance client (e.g., the surveillance client 136 of FIG. 1). At least a portion of the process 600 is executed by a monitoring center environment (e.g., the monitoring center environment 120 of FIG. 1) under control of a monitor interface (e.g., the monitor interface 130 of FIG. 1). At least a portion of the process 600 is executed by a data center environment (e.g., the data center environment 124 of FIG. 1) under control of a surveillance service (e.g., the surveillance service 128 of FIG. 1) or under control of transport services (e.g., the transport services 126 of FIG. 1). At least a portion of the process 600 is executed by a customer device (e.g., the customer device 122 of FIG. 1) under control of a customer interface (e.g., customer interface 132 of FIG. 1).

As shown in FIG. 6, the process 600 starts with the surveillance client 136 authenticating with an identity provider (e.g., the identity provider 512 of FIG. 5) by exchanging one or more authentication requests and responses 604 with the transport service 126. More specifically, in some examples, the surveillance client 136 communicates an authentication request to the transport service 126 via one or more API calls to the transport service 126. In these examples, the transport service 126 parses the authentication request to extract security credentials therefrom and passes the security credentials to the identity provider for authentication. In some examples, if the identity provider authenticates the security credentials, the identity provider generates a security token and transmits the security token to the transport service 126. The transport service 126, in turn, receives a security token and communicates the security token as a payload within an authentication response to the authentication request. In these examples, if the identity provider is unable to authenticate the security credentials, the transport service 126 generates an error code and communicates the error code as the payload within the authentication response to the authentication request. Upon receipt of the authentication response, the surveillance client 136 parses the authentication response to extract the payload. If the payload includes the error code, the surveillance client 136 can retry authentication and/or interoperate with a user interface of its host device (e.g., the user interface 212 of the base station 114 of FIG. 2) to render output indicating the authentication failure. If the payload includes the security token, the surveillance client 136 stores the security token for subsequent use in communication of location data via ingress messages. It should be noted that the security token can have a limited lifespan (e.g., 1 hour, 1 day, 1 week, 1 month, etc.) after which the surveillance client 136 may be required to reauthenticate with the transport services 126.

Continuing with the process 600, one or more DCSs 602 hosted by one or more location-based devices acquire (at operation 606) sensor data descriptive of a location (e.g., the location 102A of FIG. 1). The sensor data acquired can be any of a variety of types, as discussed above with reference to FIGS. 1-4. In some examples, one or more of the DCSs 602 acquire sensor data continuously. In some examples, one or more of the DCSs 602 acquire sensor data in response to an event, such as expiration of a local timer (a push event) or receipt of an acquisition polling signal communicated by the surveillance client 136 (a poll event). In certain examples, one or more of the DCSs 602 stream sensor data to the surveillance client 136 with minimal processing beyond acquisition and digitization. In these examples, the sensor data may constitute a sequence of vectors with individual vector members including a sensor reading and a timestamp. Alternatively or additionally, in some examples, one or more of the DCSs 602 execute additional processing of sensor data, such as generation of one or more summaries of multiple sensor readings. Further still, in some examples, one or more of the DCSs 602 execute sophisticated processing of sensor data. For instance, if the security sensor includes an image capture device, the security sensor may execute image processing routines such as edge detection, motion detection, facial recognition, threat assessment, and reportable event generation.

Continuing with the process 600, the DCSs 602 communicate the sensor data 608 to the surveillance client 136. As with sensor data acquisition, the DCSs 602 can communicate the sensor data 608 continuously or in response to an event, such as a push event (originating with the DCSs 602) or a poll event (originating with the surveillance client 136).

Continuing with the process 600, the surveillance client 136 monitors 610 the location by processing the received sensor data 608. For instance, in some examples, the surveillance client 136 executes one or more image processing routines. These image processing routines may include any of the image processing routines described above with reference to the operation 606. By distributing at least some of the image processing routines between the DCSs 602 and surveillance clients 136, some examples decrease power consumed by battery-powered devices by off-loading processing to line-powered devices. Moreover, in some examples, the surveillance client 136 may execute an ensemble threat detection process that utilizes sensor data 608 from multiple, distinct DCSs 602 as input. For instance, in at least one example, the surveillance client 136 will attempt to corroborate an open state received from a contact sensor with motion and facial recognition processing of an image of a scene including a window to which the contact sensor is affixed. If two or more of the three processes indicate the presence of an intruder, the threat score is increased and or a break-in event is declared, locally recorded, and communicated. Other processing that the surveillance client 136 may execute includes outputting local alarms (e.g., in response to detection of particular events and/or satisfaction of other criteria) and detection of maintenance conditions for location-based devices, such as a need to change or recharge low batteries and/or replace/maintain the devices that host the DCSs 602. Any of the processes described above within the operation 610 may result in the creation of location data that specifies the results of the processes.

Continuing with the process 600, the surveillance client 136 communicates the location data 614 to the surveillance service 128 via one or more ingress messages 612 to the transport services 126. As with sensor data 608 communication, the surveillance client 136 can communicate the location data 614 continuously or in response to an event, such as a push event (originating with the surveillance client 136) or a poll event (originating with the surveillance service 128).

Continuing with the process 600, the surveillance service 128 processes 616 received location data. For instance, in some examples, the surveillance service 128 executes one or more routines described above with reference to the operations 606 and/or 610. Additionally or alternatively, in some examples, the surveillance service 128 calculates a threat score or further refines an existing threat score using historical information associated with the location identified in the location data and/or other locations geographically proximal to the location (e.g., within the same zone improvement plan (ZIP) code). For instance, in some examples, if multiple break-ins have been recorded for the location and/or other locations within the same ZIP code within a configurable time span including the current time, the surveillance service 128 may increase a threat score calculated by a DCS 602 and/or the surveillance client 136. In some examples, the surveillance service 128 determines, by applying a set of rules and criteria to the location data 614, whether the location data 614 includes any reportable events and, if so, communicates an event report 618A and/or 618B to the monitor interface 130 and/or the customer interface 132. A reportable event may be an event of a certain type (e.g., break-in) or an event of a certain type that satisfies additional criteria (e.g., movement within a particular zone combined with a threat score that exceeds a threshold value). The event reports 618A and/or 618B may have a priority based on the same criteria used to determine whether the event reported therein is reportable or may have a priority based on a different set of criteria or rules.

Continuing with the process 600, the monitor interface 130 interacts 620 with monitoring personnel through, for example, one or more GUIs. These GUIs may provide details and context regarding one or more events that warrant reporting to a user. In some examples, the monitor interface 130 is configured to interact with monitoring personnel to both receive input and render output regarding alarms triggered at monitored locations, such as the location 102A. For instance, in some examples, the monitor interface 130 is configured to notify monitoring personnel of the occurrence of alarms at monitored locations, render audio-visual data and other sensor data collected by location-based devices at the monitored locations and stored in the data stores 502 and/or 504, and establish real-time connections with location-based devices. Further, in some examples, the monitor interface 130 includes controls configured to receive input specifying actions taken by the monitoring personnel to address the alarms, such as interacting with actors including customers, customer contacts, dispatchers, and/or first responders called upon to investigate the alarms. These actions can include, for example, taking or making calls from or to customers regarding an alarm; verifying the authenticity of the alarm; making contact with individuals at a location reporting an alarm; calling an appropriate Public Service Answering Point (PSAP) to request dispatch of emergency responders, such as police, fire, or emergency medical services; updating status information regarding such dispatches; updating status information for alarm; and canceling alarms and/or dispatched responders, to name a few actions. Some or all of these and other actions may be translated, by the monitor interface 130, into events that are communicated to the surveillance service 128 via a monitoring API, for example.

Continuing with the process 600, the customer interface 132 interacts 622 with at least one customer through, for example, one or more GUIs. These GUIs may provide details and context regarding one or more reportable events.

It should be noted that the processing of sensor data and/or location data, as described above with reference to the operations 606, 610, and 616, may be executed by processors disposed within various parts of the system 100. For instance, in some examples, the DCSs 602 execute minimal processing of the sensor data (e.g., acquisition and streaming only) and the remainder of the processing described above is executed by the surveillance client 136 and/or the surveillance service 128. This approach may be helpful to prolong battery runtime of location-based devices. In other examples, the DCSs 602 execute as much of the sensor data processing as possible, leaving the surveillance client 136 and the surveillance service 128 to execute only processes that require sensor data that spans location-based devices and/or locations. This approach may be helpful to increase scalability of the system 100 with regard to adding new locations.

Figure 7:
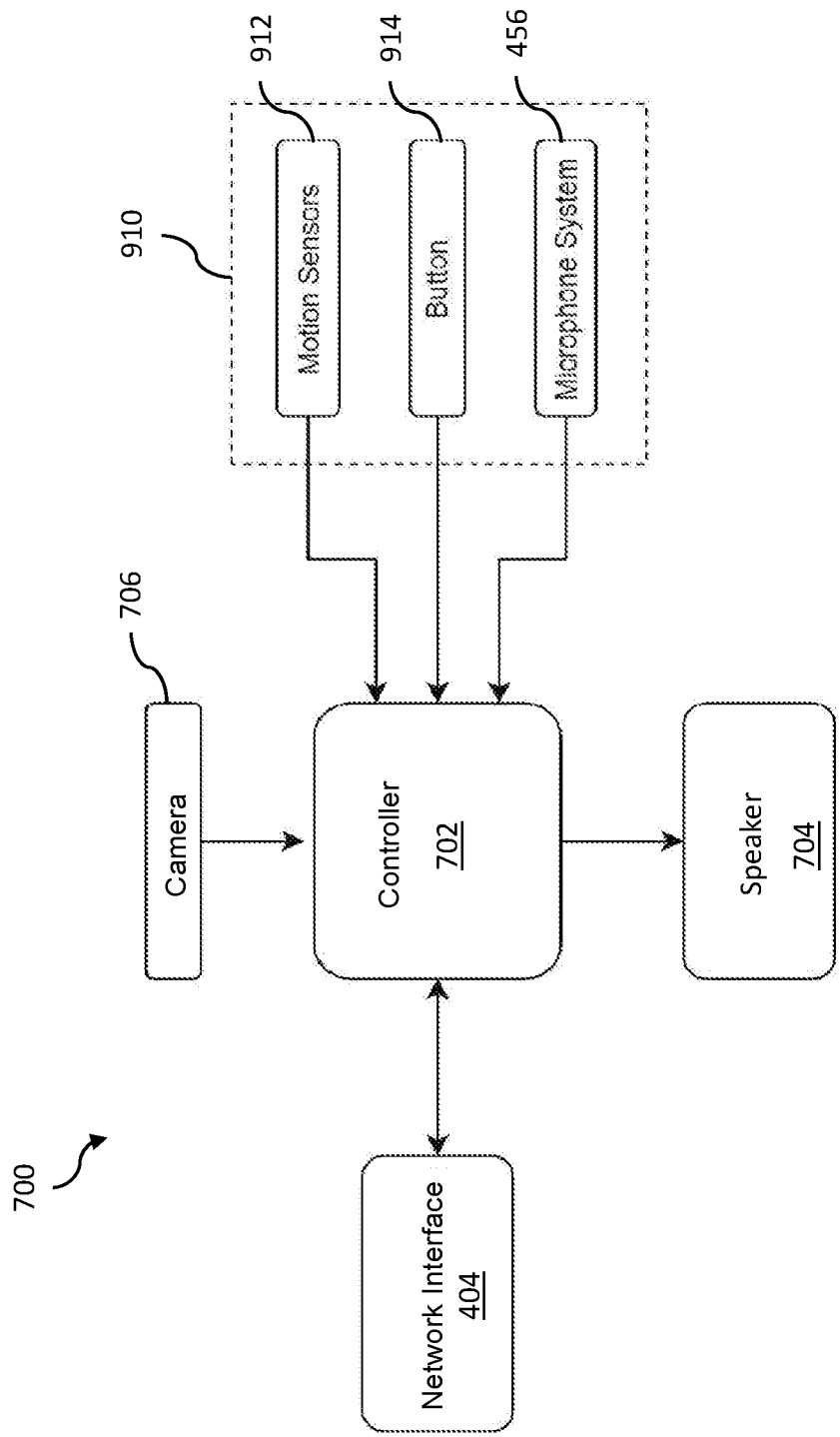
FIG. 7 is a schematic diagram of certain components of a device, according to some examples described herein.

Turning now to FIG. 7, there is illustrated a block diagram of a device 700 to control configuration and/or operation of a speaker in accordance with aspects disclosed herein. The device 700, or some components thereof, may include or be part of the image capture device 500 or 520, for example. The device 700 includes a controller 702, a speaker 704 (e.g., the speaker 454 described above), and the network interface 404. The speaker 704 may include one or more audio transducers, along with various audio processing components (e.g., one or more amplifiers, filters, and/or digital to analog converters). The device 700 may further include a camera 706, such as the image sensor assembly 450 described above, for example. The speaker 704, the camera 706, and the network interface 404 are coupled to the controller 702. The controller 702 may include one or more processors (e.g., processor 400 and/or processor 1202 described below with reference to FIG. 12), along with computer-readable memory (e.g., volatile memory 1204 and/or non-volatile memory 1208 described below with reference to FIG. 12) storing program instructions (e.g., code 1210 described below with reference to FIG. 12) that when executed by the one or more processors configure the controller 702 to perform the various functions described below.

As described above, in some instances, such as during the handling of an alarm, it may be desirable to establish communications between an individual (referred to herein as a person) at the monitored location 102A and remotely-located monitoring personnel. Accordingly, the device 700 can be configured to support a session (e.g., a communications session) with a remote device, such as one of the monitor interfaces 130 in the monitoring center environment 120, via the network interface 404, the speaker 704, and optionally the microphone system 456. In some examples, the communications session is a two-way, real-time communication session. Accordingly, the network interface 404 may include a web real-time communication (WebRTC) client, for example, that allows the device 700 to establish a real-time communication session with external devices (e.g., one of the monitor interfaces 130). A real-time communication session may refer to any mode of telecommunications in which participants can exchange information instantly or with negligible latency or transmission delays. In this context, the term real-time is synonymous with live.

In some examples, the controller 702 is configured to alter, adjust or otherwise modify one or more parameters of the speaker 704 (such as volume, for example). In particular, the controller 702 can alter or adjust a speaker profile of the speaker 704 based on proximity of the person to the device 700. As described herein, a speaker profile is a collection of speaker settings that produce a certain output from a speaker. For example, the speaker profile may include the output volume as well as one or more audio processing settings/parameters, such as equalization, filtering, compression, and/or gain. By changing the speaker profile based on the proximity of a person to the device 700, a session established via the device 700 may be more comfortable and more pleasant for the person who is being spoken to through the speaker 704.

Figure 8A:
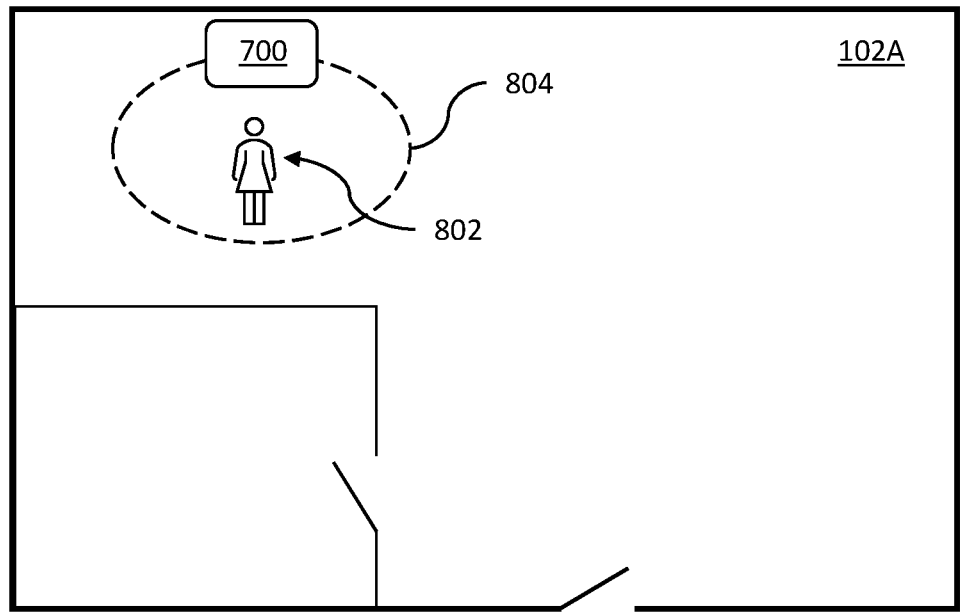
FIG. 8A is a diagram illustrating a person at a first location in a monitored environment, according to some examples described herein.
Figure 8B:
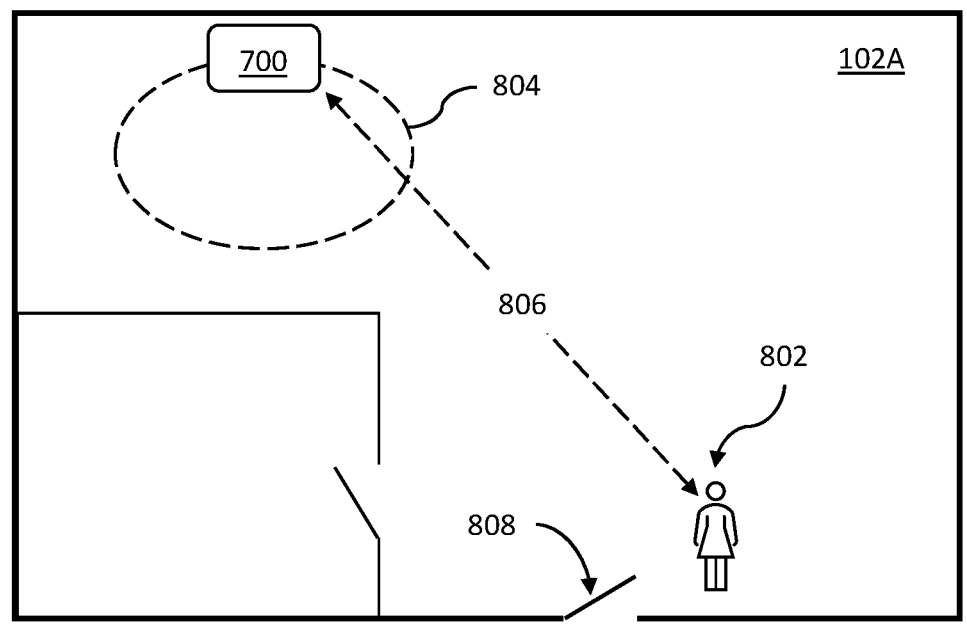
FIG. 8B is a diagram illustrating a person at a second location in the monitored environment, according to some examples described herein.

In some examples, there is a trade-off between the loudness or "reach" of the sound emitted by the speaker 704 and the clarity/comfort of that sound for a listener. Accordingly, referring to FIGS. 8A and 8B, in some examples, the device 700 can be programmed with two or more distinct speaker profiles, such as a first profile for "near-field" communication (e.g., when a person 802 is close to the device 700, as shown in FIG. 8A, for example) and a second profile for "far-field" communication (e.g., when the person 802 is more than a threshold distance 804 away from the device 700, as shown in FIG. 8B, for example). The second profile may allow the speaker 704 to produce louder sound that may be less clear, but can be heard by persons farther away from the speaker 704, whereas the first profile may allow the speaker 704 to produce quieter sound that is more clear and comfortable for a nearby listener, but may not be intelligible to persons located at far distances from the speaker 704. In some examples, the near-field threshold distance 804 may be at approximately 6 feet, 10 feet, or at a selected distance in a range of about 6 to 10 feet, from the device 700 and therefore, the far-field threshold distance may be greater than approximately 6 feet, 10 feet, or the selected distance, from the device 700. In some examples, the device 700 is configured to render far-field communications to persons 30 feet or further away from the device 700.

In some examples, the first speaker profile may have a lower volume setting and audio parameters configured to enhance audio quality, in particular speech quality. The second speaker profile may include a higher volume setting (e.g., a maximum volume setting in some examples) to increase the probability that the distant person 802 can hear the audio output by the device 700. The second speaker profile may also have audio settings (such as compression and/or equalization, for example) configured to accommodate high volume output. For example, the first (near-field) speaker profile may involve less compression, lower gain settings, and a flatter frequency response than the second speaker profile. The first speaker profile may thus provide a quieter, clearer acoustic output that may be more pleasant for a nearby person 802. In contrast, the second (far field) speaker profile may provide a louder, more heavily compressed acoustic output that, while appropriate for far away persons, may cause the speaker sound to be overpowering and uncomfortable to listen to for a person who is in close proximity to the device. Thus, by selecting an appropriate speaker profile based on the proximity of the person 802 to the device 700, the listening experience can be improved for the person, and higher speaker power (which may consume more battery power, for example) may be used only when needed (e.g., to allow the sound to reach a distant person 802).

In some examples, individual speaker profiles may include one or more fixed settings (e.g., fixed settings for volume, compression, equalization, etc.). In other examples, one or more of the speaker profiles can include adjustable settings, such as adjustable volume, for example. As such, the speaker profile may be dynamically varied in response to information conveying the proximity of the person 802 to the device 700. For example, in some instances, the far-field speaker profile may have a set volume for the speaker 704 (e.g., a volume in a range of 70-80 dB or louder). In other examples, when the far-field speaker profile is applied, the volume of the speaker 704 may be adjusted based on an estimated distance 806 between the person 802 and the device 700. For example, the speaker volume may be set to a maximum volume level if distance 806 is significantly greater than the threshold distance 804. The speaker volume may be adjusted between a near-field level, for example, and the maximum level based on the distance 806. In some examples, the speaker volume may be set to maximum if the distance 806 exceeds a certain threshold, such as 6 feet, 10 feet, 20 feet, or 30 feet, for example. The speaker volume may be controlled by adjusting a gain setting of one or more amplifiers driving the audio transducer(s) of the speaker 704, for example.

Thus, in some examples, the device 700 can be configured to dynamically select and/or modify the speaker profile to alter one or more output characteristics of the speaker 704 based on the proximity of the person 802 to the device 700, as described further below.

According to certain examples, the device 700 may acquire information indicating the proximity of the person 802 to the device 700 from any of various different sources. In some examples, the controller 702 may process one or more images obtained from the camera 706 to determine an indication of the proximity of the person 802. For example, computer vision, also called machine vision, is a type of processing relating to the analysis of images to identify and characterize objects, including people, in images and videos. Using these computer vision techniques, in some examples, the controller 702 can be configured to apply an object detection process to one or more image frames acquired with the camera 706 in order to detect the presence of the person 802 in the camera's field of view. The field of view of the camera 706 corresponds to the extent of the observable world that is "seen" at any given moment by the camera, which is generally the solid angle through which the camera is sensitive to electromagnetic radiation. Location of an object within the field of view can be accomplished using computer vision techniques. For example, there are existing foreground detection processes that can be used to locate particular objects in an image.

In some examples, because the image processing is used to determine an indication of the proximity of the person 802 to the device 700, the controller 702 can be configured to apply the object detection process to detect people within the camera's field of view. For example, the controller 702 can be configured to perform the object detection based on machine learning processes that are taught to recognize certain objects, such as people, based on a large set of training data. In some examples, the object detection process can be accomplished using an artificial neural network (ANN) that is trained to identify only specific objects of interest, such as people, for example. The ANN may be implemented in software, hardware, or a combination of both. The ANN may be configured to perform any of various known methods of identifying objects in images, such as an implementation of the "you only look once" (YOLO) process, for example.

Figure 9:
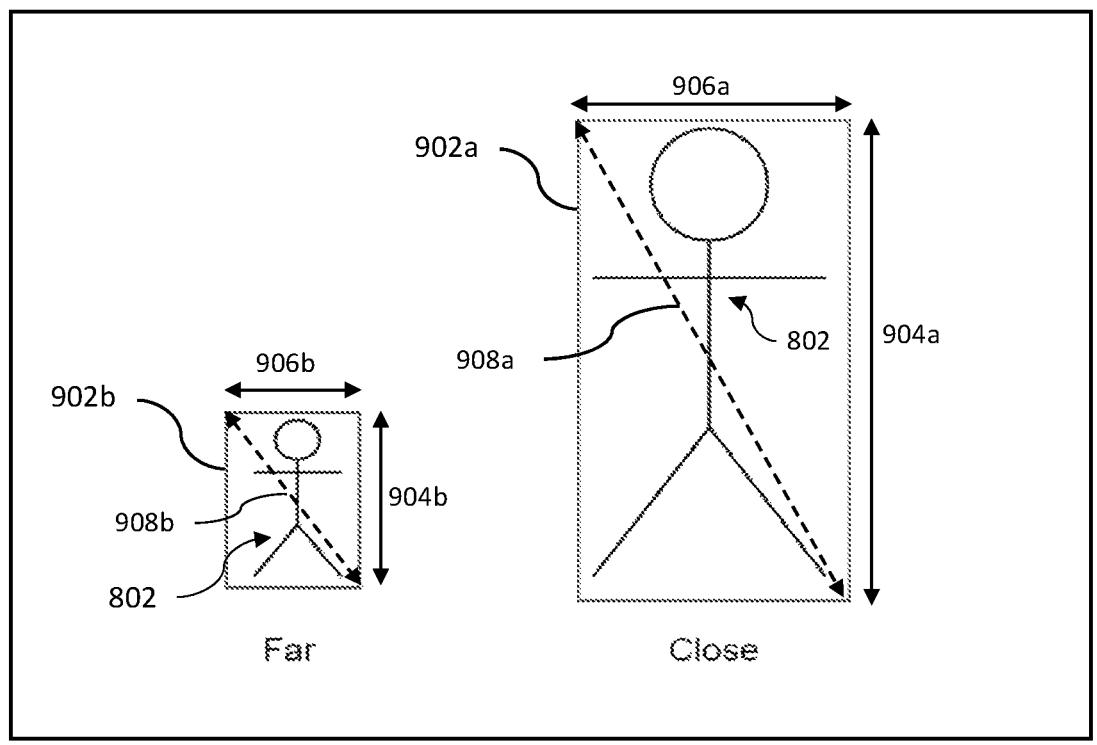
FIG. 9 is a diagram illustrating bounding boxes produced during an object detection process according to some examples described herein.

Based on applying the object detection process to an image acquired using the camera 706, the controller 702 may be configured to produce a bounding box or other indicia outlining or otherwise denoting the detected person 802 (as illustrated in FIG. 9, for example). Applying a bounding box is a computer vision technique involving drawing a rectangle, or other shape, around a detected object that specifies the position of the object in the image frame, a class of object detection (e.g., whether the detected object is a person, a vehicle, an animal, etc.), and a confidence metric representing a level of certainty that the estimated class and position are correct. For a given camera 706 (e.g., having a known field of view and image frame size), a larger bounding box indicates that the detected object (e.g., the person 802) is closer to the camera 706 (and therefore to the device 700), and a smaller bounding box indicates that the detected object is further away from the camera 706.

For example, FIG. 9 is a diagram illustrating bounding boxes 902a and 902b representing the person 802 being close or otherwise proximate to the device 700 (e.g., in the near-field) and further from the device 700 (e.g., in the far-field), respectively. As shown, the bounding box 902a representing the person 802 closer to the device 700 is larger than the bounding box 902b representing the person 802 relatively further away from the device 700. The relative size of the bounding box 902 in a given image may be determined in various ways and/or using various measures.

For example, the height 904 of the bounding box 902 may be used as an indicator of size. As shown in FIG. 9, the bounding box 902a has a height 904a that is greater than a height 904b of the bounding box 902b. In some examples, the height 904 may be measured in units of length (e.g., millimeters or inches). In other examples, the height 904 may be measured by the number of pixels of the image frame that correspond to the width 906 of the bounding box 902. In another example, the width 906 of the bounding box 902 may be used as an indicator of size. As shown in FIG. 9, the bounding box 902a has a width 906a that is greater than a width 906b of the bounding box 902b. As with the height 904, the width 906 may be measured using distance units or by corresponding number of pixels. In some examples, both the height 904 and the width 906 of the bounding box 902 may be used to determine the relative size of the bounding box. In another example, a diagonal extent 908 of the bounding box 902 may be used as an indicator of size. For example, as also shown in FIG. 9, the bounding box 902a has a diagonal extent 908a that is greater than a diagonal extent 908b of the bounding box 902b. The diagonal extent may similarly be measured using units of length or by corresponding number of pixels. In some examples, a certain diagonal extent 908 may be set as a threshold for switching between near-field and far-field speaker profiles. For example, if the diagonal extent 908 of the bounding box 902 in a given image is below the threshold value, the speaker 704 may be configured with the far-field speaker profile, whereas if the diagonal extent 908 of the bounding box 902 exceeds the threshold value, the speaker 704 may be configured with the near-field speaker profile. The threshold value used may based on the image frame size and/or field of view of the particular camera 706 used, and/or a determined correlation between the size of the bounding box 902 and the distance of the person 802 from the camera 706, as described below.

Based on the size of the bounding box 902, the distance of the person 802 from the camera 706 (and therefore from the device 700) may be inferred or estimated. As described above, a larger bounding box 902 may indicate a closer person 802. In some examples, a calibration process may be used to correlate certain bounding box sizes with known distances of an individual from the camera 706. In other examples, correlation between bounding box size and distance of an individual from the camera 706 may be determined for a certain type of camera with a set field of view and/or frame size. For example, experimental correlation can be performed by placing a person in the field of view of the camera 706 at different known distances from the camera 706 and acquiring corresponding images. These images may be processed to determine, for that type of camera 706, the sizes of the bounding boxes corresponding to the person at each of the different known distances. In this manner, a correlation can be obtained between the size of a bounding box 902 in an image acquired with the camera 706 and the estimated distance of the person 802 from the camera 706. Accordingly, calibration may not need to be performed for each camera 706 individually. Rather, the controller 702 may be programmed with known correlation information (distance to bounding box size) for the type of camera 706 included in the device 700. The controller 702 may store (e.g., in the volatile memory 1204 or non-volatile memory 1208) one or more data structures containing information that correlates a plurality of bounding box sizes with estimated distances between a detected person (e.g., the person 802) and the device 700. For example, the information may be stored in the form of a lookup table. Thus, based on the determined size of the bounding box 902, the proximity of the person 802 to the device 700 may be estimated or inferred. Accordingly, the controller 702 may select and/or adjust an appropriate speaker profile based on the estimated or inferred proximity of the person 802, as described above.

In some examples, the controller 702 may not need to estimate the proximity of the person 802 based on the size of the bounding box 902, or may not be programmed with the correlation information described above. Rather, because a determined correlation exists between the size of the bounding box 902 and the distance from the device 700 to the person 802, the controller 702 may be programmed to select/adjust the speaker profile based on or otherwise using a size of the bounding box 902. Thus, the size of the bounding box may act as a proxy for the proximity of the person 802 to the device 700.

In some examples, in addition to determining the size of the bounding box 902 as described above, the controller 702 may evaluate a "fill" of the bounding box. As used herein, the fill of the bounding box refers to the portion of the person 802 (e.g., complete body or head only) that is represented in the bounding box. The fill can also provide an indication of the proximity of the person to the device 700. For example, if the person 802 is very close to the device 700 (e.g., within the near-field threshold distance 804), the field of view of the camera 706 may be such that the entire person 802 cannot be captured in the image frame. The field of view of the camera, in such examples, may "see" only the person's head, or head and upper body, for example. In contrast, when the person 802 is further away from the device 700, the person's entire body may be captured or otherwise represented in the image frame. Accordingly, the controller 702 may apply computer vision techniques to determine the fill of the bounding box 902. In some examples, the fill may be used to validate an estimated proximity of the person 802 to the device 700. For example, if the bounding box 902 has a relatively small size, indicating that the person 802 is in the far-field of the device 700, a fill indicating that the person's entire body is captured in the bounding box can be used to confirm a determination that the person 802 is relatively far from the device 700.

Referring again to FIG. 7, in some examples, in determining the proximity of the person 802 to the device 700, the controller 702 may use information acquired from one or more other sensors or devices (e.g., sensors that may be coupled to or part of the device 700). For example, the controller 702 may optionally receive inputs from one or more additional components 910. Any one or more of the additional components 910 may be part of the device 700 or separate from and coupled to the device 700. For example, the one or more additional components 910 may include one or more motion sensors 912 (e.g., the motion sensor assembly 112, or an automated lighting system that activates one or more lights based on detected motion) and/or one or more user interface components, such as a button 914, and/or the microphone system 456. As described above, the button 914 may be a physical button or a virtual button. Input information acquired from any of these additional components 910 may be used by the controller 702, optionally in combination with one or more images acquired using the camera 706, to determine an indication of the proximity of the person 802 to the device 700 and thereby influence or inform speaker profile selection by the controller 702.

For example, the microphone system 456 may include a microphone array that can be used by the controller 702 as follows. In some examples, the microphone array includes multiple microphones that are placed a certain distance apart from one another. The controller 702 may measure the difference in the volume and/or the timing of the sound (e.g., voice input from the person 802) that reaches individual microphones of the microphone array. These differences can be used to calculate the direction of the sound source (e.g., angle of arrival). In some examples, this direction parameter can be used to increase the confidence of the object detection process. For example, if, based on the object detection process, the controller produces a bounding box 902 indicating that the person 802 has been detected to the left of the device 700, the direction parameter determined using the microphone system 456 can be used to confirm the presence of the person 802 to the left of the device 700.

In some examples, signals from one or more motion sensors 912 can be used to confirm, or improve confidence in, detection of the person 802 based on the image processing described above. For example, if a motion sensor 912 of the device 700, or positioned close to the device 700, detects the person 802, and provides a corresponding motion detection signal to the controller 702, this may indicate that the person 802 is relatively close to the device 700. Accordingly, if the size of the bounding box 902 during the object detection process indicates that the person 802 is in the near-field, the signal from the motion sensor 912 may act as confirmation of the indication of relative proximity of the person 802 to the device 700. Similarly, the controller 702 may use signals from external motion sensors 912, along with known positions of the external motion sensors, to confirm (or reject) proximity indicators based on image processing. For example, if a motion sensor 912 far from the device 700 (e.g., one positioned near the door 808 in FIG. 8B) detects the person 802, and provides a corresponding motion detection signal to the controller 702, this information can be used to validate an object detection result indicating that the person 802 is in the far-field. As described above, the motion sensor(s) 912 may be stand-alone motion sensors or may be part of another device, such as, for example, the device 700, an automated lighting system, a doorbell device (e.g., a video doorbell), or other device that includes one or more other motion-activated components. Numerous other examples and circumstances will be readily apparent and are intended to be part of this disclosure.

In some examples, the controller 702 may use motion detection signals from one or more motion sensors 912 at known locations to directly influence speaker profile selection and/or adjustment, with or without image processing performed based on images acquired with the camera 706. For example, based on receiving a motion detection signal from a motion sensor 912 proximate to or part of the device 700, the controller 702 may select and apply a speaker profile with a lower volume setting (e.g., the near-field speaker profile described above), since it can be inferred that the person 802 is close to the device 700. In contrast, based on receiving a motion detection signal from a motion sensor 912 that is positioned far away from the device 700, the controller 702 may select and apply a speaker profile having a higher volume setting.

In another example, a signal from a user interface component, such as the button 914, can be used in a similar manner. For example, if the button 914 (e.g., a power button, doorbell button, etc.) is part of the device 700, and is pressed by the person (resulting in the controller 702 receiving a button press signal from the button 914), it can be inferred that the person 802 is very close to the device 700 (close enough to reach and press the button). Accordingly, the controller 702 may select and apply the near-field speaker profile, for example. In contrast, if the person presses a button that is part of a device (e.g., a keypad, image capture device in another part of the location, designated button rendered by a customer interface on a customer device, garage door opener, doorbell, etc.) positioned away from the device 700, a button press signal from such a device can be used by the controller 702 as the basis for selecting a far-field speaker profile (e.g., increasing the volume of the speaker 704). The controller 702 may be programmed with relative positional information of various sensors around the monitored location 102A (e.g., this information can be stored in one or more data structures in the volatile memory 1204 or non-volatile memory 1208, for example, as part of the data 1212 described below with reference to FIG. 12). Furthermore, individual sensors may include, in the signal it transmits to the controller 702, identifying information. Thus, based on known positions of the various sensors relative to the device 700, and knowledge of which sensor is the source of received signals, the controller 702 can use these received signals from any of the additional components 910 as indications of the proximity of the person 802 to the device 700. Similarly, image processing information (e.g., bounding box size) from other image capture devices 500 or 520 at known positions relative to the device 700 may be used to indicate proximity of the person 802 to the device 700, and thus to inform speaker profile selection by the controller 702.

Figure 10:
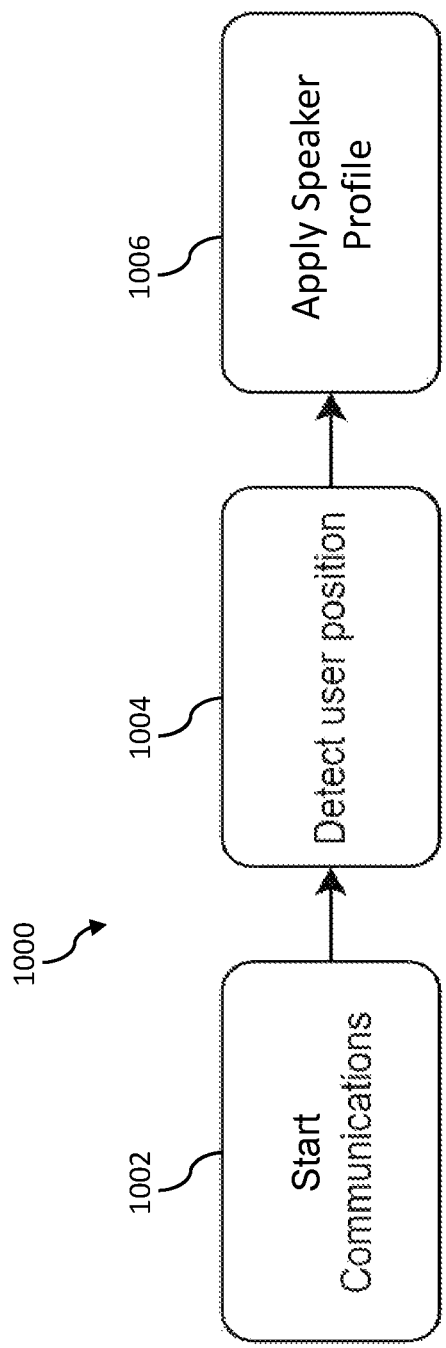
FIG. 10 is a flow diagram of a method of adjusting an output of a speaker using a speaker profile according to some examples described herein.

Referring now to FIG. 10, there is illustrated a flow diagram of one example of a method 1000 of operating a location-based device, such as the device 700, for example, for communication with a local person, according to certain aspects.

At operation 1002, a session (e.g., a communication session) is initiated. As described above, the device 700 may be configured to establish a two-way, real-time communications session with a remote device (e.g., via one of the monitor interfaces 130) using the network interface 404, the speaker 704, and the microphone 456. In some examples, the camera 706 may provide video imagery during the communications session. In other examples, the communication session at operation 1002 need not involve two-way communications. For example, the communication session may involve one-way communication to the person from the device 700 itself or from a remote device. For example, using the speaker 704, the device 700 may output certain programmed audio messages or sounds. For example, the device 700 may store certain pre-programmed sounds (e.g., chimes, siren sounds, beeps, etc.) or messages (e.g., alarm messages, warnings, etc.) in memory (e.g., volatile memory 1204 or non-volatile memory 1208). The controller 702 (e.g., via processor 1202) can be configured to control the speaker 704 to output one or more of these sounds or messages in response to an event, such as an alarm being triggered as described above. Thus, in such examples, communication from the device 700 to the person may be one-way communication.

In some examples, monitoring personnel may provide information to the person 802 via the speaker 704, whether or not the person engages in return communication via the microphone 456. For example, a monitoring professional may speak to the person via one of the monitoring interfaces 130. The speech from the monitoring professional can be transmitted to the device 700 via the network interface 404 (e.g., using any of various communication protocols as described above) and rendered via the speaker 704. In some examples, information from a remote device, such as a device in the monitoring center environment 120 or the data center environment 124, or a customer device 122, for example, may be similarly communicated to the person 802 via the speaker 704. Thus, the communication session initiated at operation 1002 may take any of various forms and convey a wide range of information to the person.

At operation 1004, the device 700 may detect an indication of a position of the person 802 at the monitored location 102A. In particular, the controller 702 may determine an indication of proximity of the person 802 to the device 700 using input from the camera 706 and/or one or more of the additional devices 910, as described above.

At operation 1006, based on the proximity of the person 802 to the device 700, the controller 702 may automatically apply (e.g., select and/or adjust) a speaker profile for the speaker 704. As described above, when the person is far away from the device 700 (in the far-field, as illustrated in FIG. 8B, for example), it may be preferable to operate the speaker 704 at high volume so that the person is more likely to hear the communication. For example, the speech or other audio output via the speaker 704 may need to be audible to a distant person over ambient sounds, such as an alarm siren or other noise. Thus, it may be preferable to set the speaker volume to, or close to, maximum. In contrast, when the person is in close proximity to the device 700 (in the near-field, as illustrated in FIG. 8A, for example), it may be less important (or desirable) for the volume of the speaker 704 to be loud, and more important for the person to be able to comfortably hear and understand the information being conveyed. Accordingly, when the person is in the near-field, the volume of the speaker 704 may be lowered, and other parameters of the speaker 704 may be altered to enhance the clarity of the audio output, particularly if the audio output includes speech. Thus, the proximity information acquired at operation 1004 can be used at operation 1006 to automatically apply an appropriate speaker profile for the speaker 704.

Figure 11:
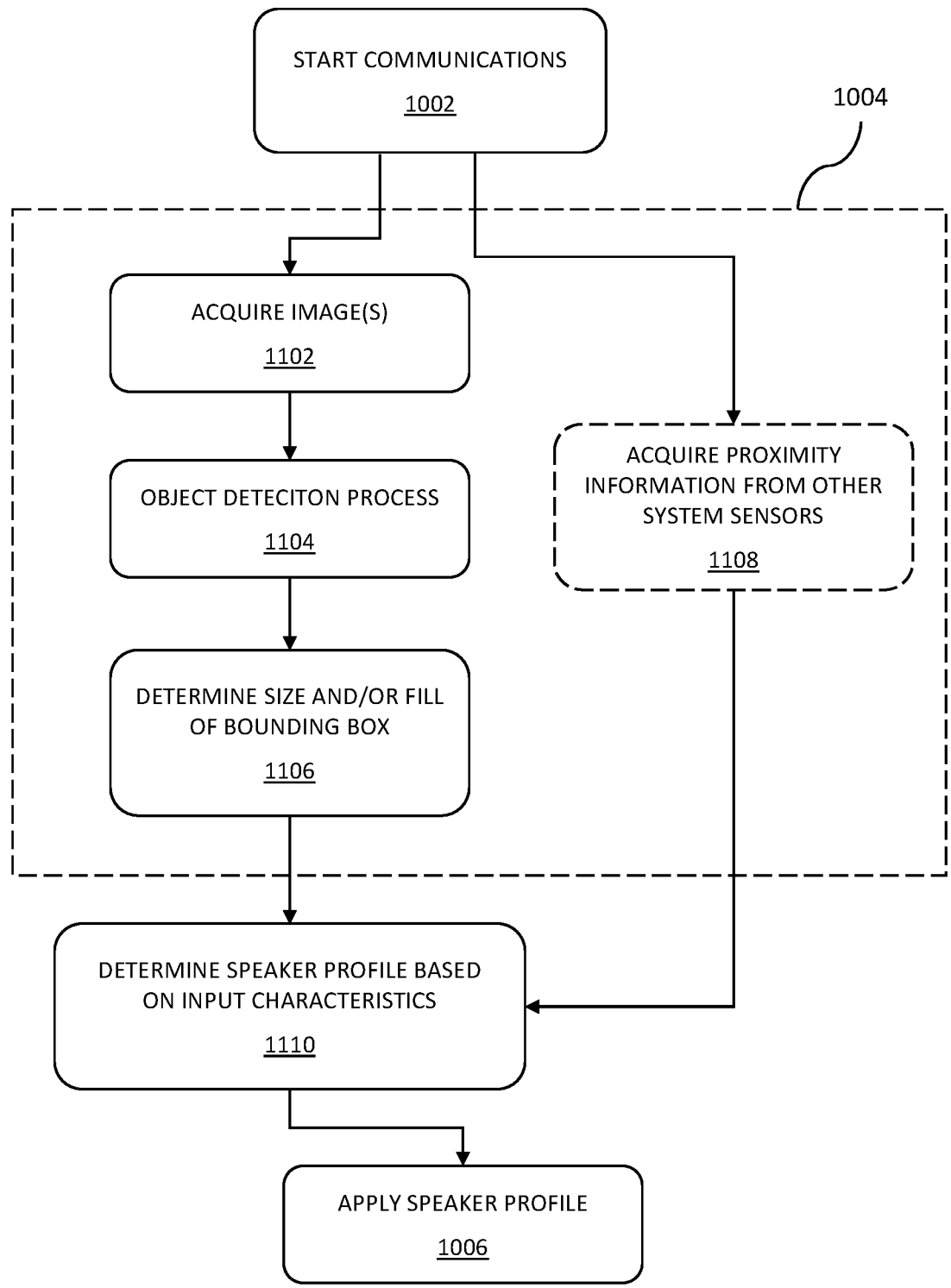
FIG. 11 is a flow diagram of a method of adjusting a speaker profile according to some examples described herein.

Referring to FIG. 11, there is illustrated a flow diagram of one embodiment of the method 800, illustrating additional details for certain examples of operation 1004.

As described above, at operation 1002, a session (e.g., a communication session) using the device 700 is initiated.

At operation 1102, one or more images of the monitored location 102A may be acquired using the camera 706. For instance, the camera 706 can be controlled to acquire one or more image frames (as described above with reference to the image capture devices 500, 520) that are then passed to the controller 702 (e.g., as digital data conveyed via the interconnection mechanism 1214 (e.g., a data bus) described below with reference to FIG. 12).

At operation 1104, the controller 702 may apply an object detection process (e.g., using computer vision techniques as described above) to at least one image to detect the person 802 in the image. The output of the object detection process at operation 1104 may include a bounding box or other indicia 902 overlaid in the image, the bounding box identifying the person 802 in the image, as described above.

At operation 1106, the size and/or fill of the bounding box may be determined, as described above. As described with reference to FIG. 9, the relative size of the bounding box 902 in a given image may be determined in various ways and/or using various measures. For example, the height 904, width 906, and/or diagonal extent 908 of the bounding box 902 may be measured in either standard units of length (e.g., millimeters or inches) or number of pixels, as described above.

In some examples, the method 1000 may include using information from one or more sensors other than the camera 706 to determine an indication of the proximity of the person 802 to the device 700. For example, as described above, the controller 702 may use signals/information acquired from one or more motion sensors 912, user interface sensors, such as the button 914, and/or the microphone system 456 to determine an indication of the proximity of the person 802 to the device 700. Accordingly, in such examples, the method 1000 includes, at operation 1108, acquiring proximity information from one or more other system sensors, as described above.

At operation 1110, the controller may select a speaker profile to use with the speaker 704 based on characteristics of the input information acquired at operation(s) 1106 and/or 1108. For example, as described above, information regarding the size and/or fill of the bounding box 902 determined at operation 1106 can provide an indication of the proximity of the person 802 to the device 700. Thus, for example, if a characteristic of the information acquired at operation 1106 is a relatively small bounding box (indicating that the person 802 is relatively far from the device 700), at operation 1110, the controller may select a speaker profile with a high volume setting (and optionally high compression, for example) suitable for person 802 in the far-field, as described above. In another example, if information acquired at operation 1106 indicates that the person 802 is in the near-field of the device 700 (e.g., a signal from the button 914 or motion sensor 912 that is part of the device 700), at operation 1110, the controller may select a speaker profile with a lower volume setting, less compression, and/or other audio processing settings to produce quieter, clear audio more pleasant for a nearby person to listen to, as described above. Numerous other examples will be apparent based on this disclosure. Thus, based on the indication of the proximity of the person 802 to the device 700 (determined from information acquired at operations 1106 and/or 1108), the controller 702 may select an appropriate speaker profile.

At operation 1006, the controller 702 applies the speaker profile for the speaker 704. As described above, applying the speaker profile can include controlling various components that are part of the audio drive chain for the speaker 704, such as one or more amplifiers and/or filters, for example, to produce the desired audio output characteristics.

Figure 12:
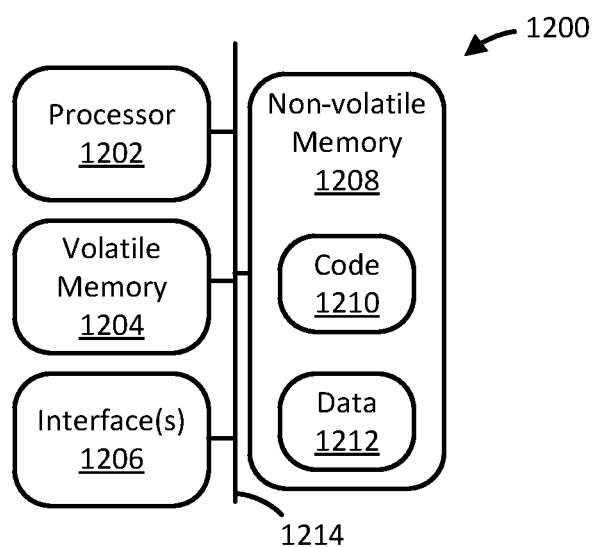
FIG. 12 is a schematic diagram of a computing device, according to some examples described herein.

Turning now to FIG. 12, a computing device 1200 is illustrated schematically. As shown in FIG. 12, the computing device includes at least one processor 1202, volatile memory 1204, one or more interfaces 1206, non-volatile memory 1208, and an interconnection mechanism 1214. The non-volatile memory 1208 includes code 1210 and at least one data store 1212. The computing device 1200 may be used to implement various components (or parts thereof) of the device 700, including, for example, the controller 702. The code 1210 may include any or all of the code 208, 308, and/or 408 described above.

In some examples, the non-volatile (non-transitory) memory 1208 includes one or more read-only memory (ROM) chips; one or more hard disk drives or other magnetic or optical storage media; one or more solid state drives (SSDs), such as a flash drive or other solid-state storage media; and/or one or more hybrid magnetic and SSDs. In certain examples, the code 1210 stored in the non-volatile memory can include an operating system and one or more applications or programs that are configured to execute under the operating system. Alternatively or additionally, the code 1210 can include specialized firmware and embedded software that is executable without dependence upon a commercially available operating system. Regardless, execution of the code 1210 can result in manipulated data that may be stored in the data store 1212 as one or more data structures. The data structures may have fields that are associated through colocation in the data structure. Such associations may likewise be achieved by allocating storage for the fields in locations within memory that convey an association between the fields. However, other mechanisms may be used to establish associations between information in fields of a data structure, including through the use of pointers, tags, or other mechanisms. The non-volatile memory 1208 may be used to implement any of the non-volatile memory 206, 306, and/or 406 described above.

Continuing the example of FIG. 12, the processor 1202 can be one or more programmable processors to execute one or more executable instructions, such as a computer program specified by the code 1210, to control the operations of the computing device 1200. As used herein, the term "processor" describes circuitry that executes a function, an operation, or a sequence of operations. The function, operation, or sequence of operations can be hard coded into the circuitry or soft coded by way of instructions held in a memory device (e.g., the volatile memory 1204) and executed by the circuitry. In some examples, the processor 1202 is a digital processor, but the processor 1202 can be analog, digital, or mixed. As such, the processor 1202 can execute the function, operation, or sequence of operations using digital values and/or using analog signals. In some examples, the processor 1202 can be embodied in one or more application specific integrated circuits (ASICs), microprocessors, digital signal processors (DSPs), graphics processing units (GPUs), neural processing units (NPUs), microcontrollers, field programmable gate arrays (FPGAs), programmable logic arrays (PLAs), or multicore processors. Examples of the processor 1202 that are multicore can provide functionality for parallel, simultaneous execution of instructions or for parallel, simultaneous execution of one instruction on more than one piece of data. The processor 1202 may be used to implement any of the processors 200, 300, and/or 400 described above.

Continuing with the example of FIG. 12, prior to execution of the code 1210 the processor 1202 can copy the code 1210 from the non-volatile memory 1208 to the volatile memory 1204. In some examples, the volatile memory 1204 includes one or more static or dynamic random access memory (RAM) chips and/or cache memory (e.g. memory disposed on a silicon die of the processor 1202). Volatile memory 1204 can offer a faster response time than a main memory, such as the non-volatile memory 1208. The volatile memory 1204 may be used to implement any of the volatile memory 202, 302, and/or 402 described above.

Through execution of the code 1210, the processor 1202 can control operation of the interfaces 1206. The interfaces 1206 can include network interfaces (e.g., the network interface 404). These network interfaces can include one or more physical interfaces (e.g., a radio, an ethernet port, a USB port, etc.) and a software stack including drivers and/or other code 1210 that is configured to communicate with the one or more physical interfaces to support one or more LAN, PAN, and/or WAN standard communication protocols. The communication protocols can include, for example, TCP and UDP among others. As such, the network interfaces enable the computing device 1200 to access and communicate with other computing devices via a computer network.

The interfaces 1206 can include user interfaces. For instance, in some examples, the user interfaces include user input and/or output devices (e.g., a keyboard, a mouse, a touchscreen, a display, a speaker, a camera, an accelerometer, a biometric scanner, an environmental sensor, the button 914, etc.) and a software stack including drivers and/or other code 1210 that is configured to communicate with the user input and/or output devices. As such, the user interfaces enable the computing device 1200 to interact with users to receive input and/or render output. This rendered output can include, for instance, one or more GUIs including one or more controls configured to display output and/or receive input. The input can specify values to be stored in the data store 1212. The output can indicate values stored in the data store 1212.

Continuing with the example of FIG. 12, the various features of the computing device 1200 described above can communicate with one another via the interconnection mechanism 1214. In some examples, the interconnection mechanism 1214 includes a communications bus.

Various innovative concepts may be embodied as one or more methods, of which examples have been provided. The acts performed as part of a method may be ordered in any suitable way. Accordingly, examples may be constructed in which acts are performed in an order different than illustrated, which may include performing some acts simultaneously, even though shown as sequential acts in illustrative examples.

Descriptions of additional examples follow. Other variations will be apparent in light of this disclosure.

Example 1 is a method comprising initiating a communication session using a device having a speaker, processing input from at least one sensor to determine an indication of proximity of a person to the device, based on the indication of proximity, automatically selecting a speaker profile for the speaker, and applying the speaker profile to automatically control one or more audio characteristics of the speaker.

Example 2 includes the method of Example 1, wherein the at least one sensor includes a camera, and wherein processing the input comprises processing an image acquired with the camera to produce a bounding box in the image, the bounding box representing the person, and determining a size of the bounding box, wherein the size of the bounding box represents the indication of proximity of the person.

Example 3 includes the method of Example 2, wherein determining the size of the bounding box includes determining at least one of a height of the bounding box, a width of the bounding box, or a diagonal extent of the bounding box.

Example 4 includes the method of one of Examples 2 or 3, wherein processing the image comprises applying an object detection process to the image to detect the person.

Example 5 includes the method of Example 4, wherein applying the object detection process comprises applying a trained artificial neural network trained to detect people.

Example 6 includes the method of any one of Examples 1-5, wherein the device includes a microphone, and wherein processing the input comprises processing audio input from the microphone to determine the indication of proximity of the person to the device.

Example 7 includes the method of Example 1, wherein the at least one sensor includes a motion detector, and wherein processing the input comprises acquiring a signal from the motion detector, and determining the indication of proximity based on a known location of the motion detector relative to the device.

Example 8 includes the method of Example 7, wherein the motion detector is part of an automated lighting system or other device having one or more motion-activated components.

Example 9 includes the method of any one of Examples 1-8, wherein the one or more audio characteristics of the speaker include a volume of the speaker, and wherein applying the speaker profile includes controlling the volume of the speaker.

Example 10 includes the method of Example 9, wherein controlling the volume of the speaker includes lowering the volume based on the indication of proximity indicating that the person is within a threshold distance from the device.

Example 11 provides a device comprising a camera, a speaker, and a controller configured to process an image acquired by the camera to determine an indication of proximity of a person to the device, and to automatically adjust a volume of sound output by the speaker based on the indication of proximity.

Example 12 includes the device of Example 11, further comprising a network interface configured to support a communication session between the device and a remote device.

Example 13 includes the device of one of Examples 11 or 12, wherein to process the image, the controller is configured to apply an object detection process to the image to detect the person, produce a bounding box representing the person in the image, and determine a size of the bounding box, the size of the bounding box corresponding to the indication of proximity of the person.

Example 14 includes the device of Example 13, wherein to apply the object detection process, the controller is configured to operate an artificial neural network trained to detect people.

Example 15 includes the device of one of Examples 13 or 14, wherein to determine the size of the bounding box, the controller is configured to determine at least one of a height of the bounding box, a width of the bounding box, or a diagonal extent of the bounding box.

Example 16 includes the device of any one of Examples 11-15, wherein to adjust the volume of the sound output by the speaker, the controller is configured to lower the volume based on the indication of proximity indicating that the person is within a threshold distance from the device.

Example 17 includes the device of any one of Examples 11-16, wherein the controller is further configured to control one or more audio processing parameters of the speaker based on the indication of proximity of the person, the one or more audio processing parameters including an equalization setting, a compression setting, a filtering setting, and/or a gain setting.

Example 18 includes the device of any one of Examples 11-17, wherein the controller is further configured to acquire a signal from a motion detector, and to confirm the indication of proximity of the person based on the signal from the motion detector.

Example 19 includes the device of Example 18, wherein the motion detector is part of an automated lighting system.

Example 20 includes the device of Example 18, wherein the device comprises the motion detector.

Example 21 includes the device of any one of Examples 11-20, further comprising a microphone, wherein the controller is further configured to process audio input from the microphone to confirm the indication of proximity of the person to the device.

Example 22 includes the device of any one of Examples 11-21, wherein the controller is further configured to acquire a signal from a button, and to confirm the indication of proximity of the person based on the signal from the button.

Example 23 includes the device of Example 22, wherein the button is part of: the device, a doorbell, a garage door opener, a keypad, or other user interface.

Example 24 provides one or more non-transitory computer readable media storing sequences of instructions executable to control a security camera disposed at a location, the sequences of instructions comprising instructions to acquire an image, apply an object detection process to the image to detect a person in the image, determine an indication of proximity of the person to the security camera, and control a volume of a speaker of the security camera based on the indication of proximity.

Example 25 includes the one or more non-transitory computer-readable media of Example 20, wherein the sequences of instructions further comprise instructions to produce a bounding box based on the object detection process, the bounding box identifying the person in the image. The sequences of instructions further comprise instructions to determine the indication of proximity of the person by determining a size of the bounding box.

Example 26 provides a method comprising processing, by a device that includes a camera, an image to generate a bounding box that surrounds a portion of content of the image, the portion of content of the image including at least a portion of a person shown in the image, determining a proximity of the person to the device based on a size of the bounding box, and adjusting a speaker of the device based on the proximity of the person to modify one or more audio characteristics of sound output by the speaker based on the proximity of the person to the device.

Example 27 includes the method of Example 26, further comprising initiating a communication session using the device.

Example 28 includes the method of one of Examples 26 or 27, wherein determining the proximity of the person includes determining the size of the bounding box by determining at least one of a height of the bounding box, a width of the bounding box, or a diagonal extent of the bounding box.

Example 29 includes the method of any one of Examples 26-28, wherein processing the image comprises applying an object detection process to the image to detect the person.

Example 30 includes the method of Example 29, wherein applying the object detection process comprises applying a trained artificial neural network trained to detect people.

Example 31 includes the method of any one of Examples 26-30, wherein the device includes a microphone, and the method further comprises processing audio input from the microphone to determine the proximity of the person to the device.

Example 32 includes the method of any one of Examples 26-31, further comprising acquiring a signal from a motion detector, and determining the proximity of the person based on a recorded location of the motion detector relative to the device.

Example 33 includes the method of Example 32, wherein the motion detector is part of an automated lighting system.

Example 34 includes the method of any one of Examples 26-33, further comprising acquiring a signal from a button, and determining the proximity of the person based on the signal from the button.

Example 34 includes the method of Example 34, wherein the button is part of: the device, a doorbell, a garage door opener, a keypad, or other user interface.

Example 35 includes the method of any one of Examples 26-32, wherein the one or more audio characteristics of the sound output by the speaker include a volume of the sound.

Example 36 includes the method of Example 35, wherein adjusting the speaker includes lowering the volume of the sound based on the proximity of the person being within a threshold distance from the device.

Example 37 provides a device comprising a camera, a speaker, and a controller, wherein the controller is configured to process an image acquired by the camera to produce a bounding box that surrounds a portion of content of the image, and to determine a size of the bounding box, wherein the portion of content of the image includes at least a portion of a person shown in the image, and the size of the bounding box indicates a proximity of the person to the device, the controller being further configured to adjust a volume of sound output by the speaker based on the proximity of the person to the device.

Example 38 includes the device of Example 37, wherein to process the image, the controller is configured to apply an object detection process to the image to detect the person.

Example 39 includes the device of Example 38, wherein to apply the object detection process, the controller is configured to operate an artificial neural network trained to detect people.

Example 40 includes the device of any one of Examples 37-39, wherein to determine the size of the bounding box, the controller is configured to determine at least one of a height of the bounding box, a width of the bounding box, or a diagonal extent of the bounding box.

Example 41 includes the device of any one of Examples 37-40, further comprising a network interface configured to support a communication session between the device and a remote device.

Example 42 includes the device of any one of Examples 37-41, wherein to adjust the volume of the sound output by the speaker, the controller is configured to lower the volume based on the proximity of the person being within a threshold distance from the device.

Example 43 includes the device of Example 42, wherein the threshold distance is 6 feet, 10 feet, or a selected distance in a range of 6 feet to 10 feet.

Example 44 includes the device of any one of Examples 37-43, wherein the controller is further configured to control one or more audio processing parameters of the speaker based on the proximity of the person, the one or more audio processing parameters including an equalization setting, a compression setting, a filtering setting, and/or a gain setting.

Example 45 includes the device of any one of Examples 37-44, wherein the controller is further configured to acquire a signal from a motion detector, and to confirm the proximity of the person based on the signal from the motion detector.

Example 46 includes the device of Example 45, wherein the motion detector is part of an automated lighting system.

Example 47 includes the device of Example 45, wherein the device comprises the motion detector.

Example 48 includes the device of any one of Examples 37-47, further comprising a microphone, wherein the controller is further configured to process audio input from the microphone to confirm the proximity of the person to the device.

Example 49 includes the device of any one of Examples 37-48, wherein the controller is further configured to acquire a signal from a button, and to confirm the indication of proximity of the person based on the signal from the button.

Example 50 includes the device of Example 49, wherein the button is part of: the device, a doorbell, a garage door opener, a keypad, or other user interface.

Example 51 provides one or more non-transitory computer-readable media storing sequences of instructions executable to control a security camera disposed at a location. The sequences of instructions comprises instructions to acquire an image, apply an object detection process to the image to detect a person in the image, based on the object detection process, produce a bounding box identifying the person in the image, determine a size of the bounding box, the size indicating proximity of the person to the security camera, and control a volume of a speaker of the security camera based on the proximity of the person to the security camera.

Example 52 includes the one or more non-transitory computer-readable media of claim 19, wherein to control the volume of the speaker, the sequences of instructions comprise instructions to lower the volume based on the proximity of the person being within a threshold distance from the security camera.

Having described several examples in detail, various modifications and improvements will readily occur to those skilled in the art. Such modifications and improvements are intended to be within the scope of this disclosure. Accordingly, the foregoing description is by way of example only, and is not intended as limiting.

The invention claimed is:
1. A method comprising:
processing, by a device that includes a camera, an image to generate a bounding box that surrounds a portion of content of the image, the portion of content of the image including at least a portion of a person shown in the image;

determining a proximity of the person to the device based on a size of the bounding box; and adjusting a profile for a speaker of the device based on the proximity of the person to modify one or more characteristics of sound output by the speaker based on the proximity of the person to the device, the one or more characteristics including a volume of the sound and a frequency response of the sound.

2. The method of claim 1, wherein determining the proximity of the person includes determining the size of the bounding box by determining at least one of a height of the bounding box, a width of the bounding box, or a diagonal extent of the bounding box.

3. The method of claim 1, wherein processing the image comprises applying a trained artificial neural network to detect the person, the trained artificial neural network being trained to detect people.

4. The method of claim 1, wherein the device includes a microphone, and the method further comprises:

processing audio input from the microphone to determine the proximity of the person to the device.

5. The method of claim 1, further comprising:

acquiring a signal from a motion detector, the motion detector being separate from the device and the signal indicating detection of the person by the motion detector; and determining the proximity of the person based on a recorded location of the motion detector relative to the device.

6. The method of claim 1, wherein adjusting the profile includes lowering the volume of the sound based on the proximity of the person being within a threshold distance from the device.

7. The method of claim 1, wherein adjusting the profile includes selecting between a first profile and a second profile, the first profile having first settings for processing audio and the second profile having second settings for processing audio different from the first settings, wherein the first and second settings include settings for equalization, filtering, and gain that is dependent on frequencies of the sound.

8. The method of claim 7, further comprising:

initiating a communication session using the device; and adjusting the first or second settings to optimize a quality of speech output by the speaker during the communication session.

9. A device comprising:

a camera having a base configured to install the camera at a fixed location, the camera configured to acquire images that record movement of a person over an area of the fixed location that is within a field of view of the camera;

a speaker; and a controller configured to process an image acquired by the camera to produce a bounding box that surrounds a portion of content of the image, and to determine a size of the bounding box, wherein the portion of content of the image includes at least a portion of the person shown in the image, and the size of the bounding box indicates a proximity of the person to the device, the controller being further configured to adjust settings, of the speaker, for processing audio to adjust a volume and a frequence response of sound output by the speaker based on the proximity of the person to the device.

10. The device of claim 9, wherein to process the image, the controller is configured to operate an artificial neural network trained to detect people.

11. The device of claim 9, wherein to determine the size of the bounding box, the controller is configured to determine at least one of a height of the bounding box, a width of the bounding box, or a diagonal extent of the bounding box.

12. The device of claim 9, further comprising:

a network interface configured to support a communication session between the device and a remote device;

wherein the controller is further configured to adjust the settings for processing audio to optimize, based on the proximity of the person to the device, a quality of speech output by the speaker during the communication session.

13. The device of claim 9, wherein to adjust the volume of the sound output by the speaker, the controller is configured to lower the volume based on the proximity of the person being within a threshold distance from the device.

14. The device of claim 13, wherein the controller is configured to flatten the frequency response of the sound output by the speaker based on the proximity of the person being within the threshold distance from the device.

15. The device of claim 9, wherein the settings include equalization, compression, filtering, and gain that is dependent on frequencies of the sound.

16. The device of claim 9, wherein the controller is further configured to:

acquire a signal from a motion detector, the motion detector being separate from the camera and the signal indicating detection of the person by the motion detector; and confirm the proximity of the person based on the signal from the motion detector and a recorded location of the motion detector relative to the camera.

17. The device of claim 9, further comprising:

a microphone;

wherein the controller is further configured to process audio input from the microphone to confirm the proximity of the person to the device.

18. One or more non-transitory computer-readable media storing sequences of instructions executable to control a security camera installed at a fixed location, the sequences of instructions comprising instructions to cause the security camera to:

acquire an image of a scene proximate to the fixed location;

apply an object detection process to the image to detect a person in the image;

based on the object detection process, produce a bounding box identifying the person in the image;

determine a size of the bounding box, the size indicating proximity of the person to the fixed location of the security camera; and configure a profile of a speaker of the security camera based on the proximity of the person to the fixed location of the security camera, the profile describing an output volume of the speaker and one or more settings of the speaker for processing audio, the settings including gain, compression, filtering, and/or equalization.

19. The one or more non-transitory computer-readable media of claim 18, wherein to configure the profile of the speaker, the sequences of instructions comprise instructions to:

lower the output volume based on the proximity of the person being within a threshold distance from the security camera.

20. The one or more non-transitory computer-readable media of claim 18, wherein to configure the profile of the speaker, the sequences of instructions comprise instructions to:
- apply a first profile based on the proximity of the person being within a threshold distance from the security camera, the first profile describing a first output volume and a first frequency response of sound output by the speaker; or
- apply a second profile based on the proximity of the person being beyond the threshold distance from the security camera, the second profile describing a second output volume louder that the first output volume and a second frequency response wider than the first frequency response.

\* \* \* \* \*